(12) United States Patent
Inokuchi et al.

(10) Patent No.: US 8,819,091 B2
(45) Date of Patent: Aug. 26, 2014

(54) INFORMATION PROCESSING APPARATUS, INFORMATION PROCESSING SYSTEM, INFORMATION RECORDING MEDIUM, INFORMATION PROCESSING METHOD, AND PROGRAM

(75) Inventors: Tatsuya Inokuchi, Tokyo (JP); Takahisa Ohgami, Tokyo (JP); Goh Shimizu, Tokyo (JP); Koichi Sotoyama, Tokyo (JP); Satoshi Aida, Tokyo (JP); Shizuka Watanabe, Tokyo (JP); Yoshinori Ichikawa, Tokyo (JP); Hiroshi Kimura, Saitama (JP)

(73) Assignee: Sony Corporation, Tokyo (JP)

(*) Notice: Subject to any disclaimer, the term of this patent is extended or adjusted under 35 U.S.C. 154(b) by 388 days.

(21) Appl. No.: 12/496,020

(22) Filed: Jul. 1, 2009

(65) Prior Publication Data
US 2010/0121894 A1    May 13, 2010

(30) Foreign Application Priority Data

Jul. 11, 2008   (JP) .................................. 2008-181916

(51) Int. Cl.
*G06F 17/30* (2006.01)
*G11B 27/10* (2006.01)

(52) U.S. Cl.
CPC ........ *G11B 27/10* (2013.01); *G11B 2220/2541* (2013.01); *G11B 2220/2562* (2013.01)
USPC ............. 707/822; 707/E17.005; 707/E17.009

(58) Field of Classification Search
USPC ........... 707/822, E17.005, E17.009, E17.108; 709/217
See application file for complete search history.

(56) References Cited

U.S. PATENT DOCUMENTS

| | | | | |
|---|---|---|---|---|
| 5,644,782 A | * | 7/1997 | Yeates et al. ..................... 710/10 |
| 2002/0062320 A1 | * | 5/2002 | Shimojima et al. ........ 707/104.1 |
| 2004/0250246 A1 | * | 12/2004 | Veselov et al. ................ 717/169 |
| 2006/0077773 A1 | * | 4/2006 | Seo et al. ................... 369/30.09 |

(Continued)

FOREIGN PATENT DOCUMENTS

| | | |
|---|---|---|
| JP | 2008-522255 A | 6/2008 |
| WO | WO 2006/051037 A1 | 5/2006 |

(Continued)

OTHER PUBLICATIONS

Office Action issued Dec. 4, 2012 in Japanese Patent Application No. 2008-181916.

*Primary Examiner* — Shiow-Jy Fan
(74) *Attorney, Agent, or Firm* — Oblon, Spivak, McClelland, Maier & Neustadt, L.L.P.

(57) ABSTRACT

An information processing apparatus includes a communicating section that executes communication with a server, a local storage section that stores subsequent data acquired from the server, and a data processing section that executes an acquisition process of the subsequent data, and a data playback process using data stored on a disc and the subsequent data stored on the local storage section. The data processing section builds a virtual file system for reading data stored on the disc and the local storage section, at the time of the data playback process, and performs the acquisition process of the subsequent data by transmitting a package ID to the server at the time of the acquisition process of the subsequent data, the package ID being information specifying a package corresponding to a file set necessary for building or updating the virtual file system.

12 Claims, 15 Drawing Sheets

(56) References Cited

U.S. PATENT DOCUMENTS

2006/0140091 A1* 6/2006 Iwamoto et al. ............. 369/53.2
2007/0136282 A1* 6/2007 Takashima ........................ 707/6
2007/0189718 A1 8/2007 Kobayashi et al.
2007/0286575 A1* 12/2007 Oashi et al. ...................... 386/95
2008/0133564 A1* 6/2008 Gandolph et al. ............ 707/101

FOREIGN PATENT DOCUMENTS

| WO | WO 2006/059864 A1 | 6/2006 |
| WO | WO 2006/100879 A1 | 9/2006 |
| WO | WO 2006/101047 A1 | 9/2006 |
| WO | WO 2007/058025 A1 | 5/2007 |
| WO | WO 2007/111208 A1 | 10/2007 |

* cited by examiner

FIG. 4

| INDEX<br>(INDEX THAT CAN BE DISTINGUISHED BY APPLICATION LAYER, SUCH AS TITLE) | CONTENT MANAGEMENT UNIT NUMBER (CPS UNIT NUMBER) | ENCRYPTED CPS UNIT KEY |
|---|---|---|
| TITLE 1 | CPS 1 | [Ku1] |
| TITLE 2 | CPS 1 | [Ku1] |
| APPLICATION 1 | CPS 2 | [Ku2] |
| APPLICATION 2 | CPS 3 | [Ku3] |
| ⋮ | ⋮ | ⋮ |
| DATA GROUP 1 | CPS 4 | [Ku4] |
| DATA GROUP 2 | CPS 5 | [Ku5] |
| ⋮ | ⋮ | ⋮ |

FIG. 7

| [FILE NAME WITHIN LOCAL STORAGE SECTION] | [STUDIO ID] | [CONVERTED FILE NAME] |
|---|---|---|
| studioA.STREAM.00001.m2ts | 1 | BDMV/STREAM/00001.m2ts |
| studioA.CLIPINF.00001.clpi | 1 | BDMV/CLIPINF/00001.clpi |
| studioB.STREAM.01001.m2ts | 1,2,5 | BDMV/STREAM/01001.m2ts |
| studioB.CLIPINF.01001.clpi | 1,2,5 | BDMV/CLIPINF/01001.clpi |
| studioC.STREAM.00002.m2ts | 1 | BDMV/STREAM/00002.m2ts |
| studioC.STREAM.00002.m2ts | 2 | BDMV/STREAM/00012.m2ts |
| studioD.jimaku.dat | 1 | BDMV/STREAM/00099.m2ts |

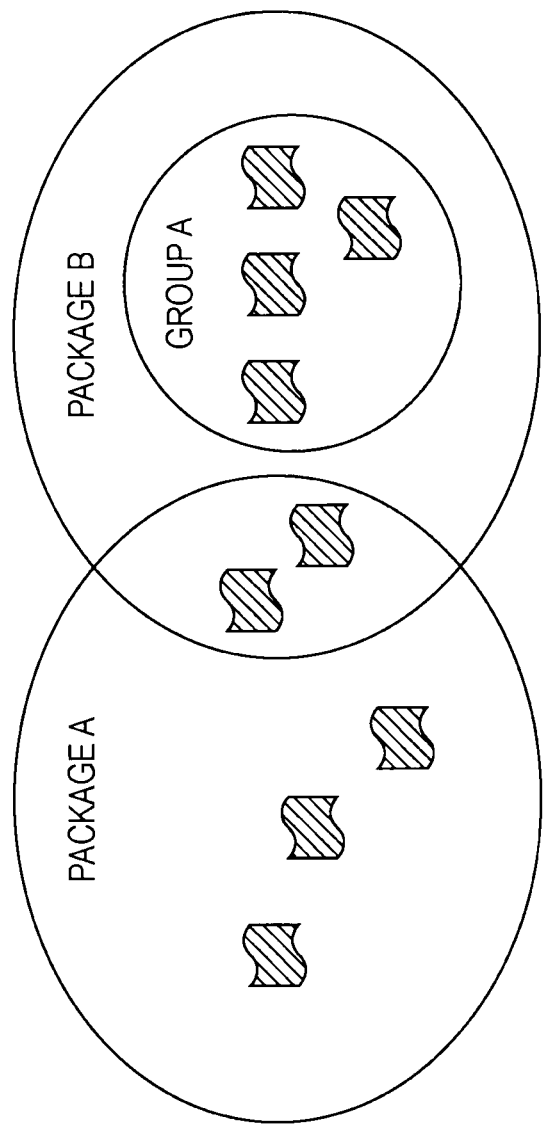

INFORMATION PROCESSING APPARATUS, INFORMATION PROCESSING SYSTEM, INFORMATION RECORDING MEDIUM, INFORMATION PROCESSING METHOD, AND PROGRAM

BACKGROUND OF THE INVENTION

1. Field of the Invention

The present invention relates to an information processing apparatus, an information processing system, an information recording medium, an information processing method, and a program. More specifically, the present invention relates to an information processing apparatus, an information processing system, an information recording medium, an information processing method, and a program, with which sub-content or the like corresponding to content stored on an information recording medium such as a Blu-ray Disc® or a DVD is downloaded from a server and stored onto a local storage section, thereby performing a content usage process that uses content stored on the disc and content (subsequent data) stored on the local storage section.

2. Description of the Related Art

Various kinds of software data, including audio data such as music, image data such as movies, game programs, and various application programs (hereinafter, these will be referred to as content) can be stored on a recording medium, for example, an information recording medium such as a Blu-ray Disc® or a DVD (Digital Versatile Disc), and then provided to the user. A Blu-ray Disc® using blue laser is a disc capable of high-density recording and can record a large volume of video content or the like as high-definition data, and its use has been increasing recently.

A content-storing disc can be mounted in various kinds of apparatus, for example, a playback apparatus such as a disc player owned by a user, or a PC (Personal Computer), for playback of content.

Distribution rights or the like for many kinds of content such as music data and image data are typically owned by their creators or sellers. Therefore, offering of such content to a user is typically subject to a certain usage restriction, that is, only an authorized user is permitted to use the content. For example, control is performed so as to prevent indiscriminate copying of content without permission or the like.

Examples of content usage control adopted for a Blu-ray Disc® include dividing content into units (CPS units) and performing encryption on a unit-by-unit basis, or performing management in association with usage control information (Usage Rule). Content is divided into CPS units, and use of each CPS unit is permitted within a range defined by the usage control information (Usage Rule) corresponding to the unit.

In many cases, usage control information (Usage Rule) is recorded onto a disc together with content. At the time of content playback, a playback apparatus reads, from the disc, usage control information corresponding to the CPS unit to which the playback content belongs, and performs content playback in accordance with the usage control information. Usage control information (Usage Rule) is information recording, for example, content copy/playback control information (CCI), more specifically, information regarding permitted forms of usage and unpermitted forms of usage, such as whether copying of the content in question is permitted or not permitted.

If content belonging to a CPS unit is encrypted content, a CPS unit key as an encryption key corresponding to the unit is associated with the unit. At playback of the encrypted content, a decryption process using the CPU unit key is performed. A CPS unit file storing a CPS unit key is also recorded on a disc. In this way, usage of content stored on a Blu-ray Disc® is controlled under strict usage management.

Further, the Blu-ray Disc® standard also defines usage control in a case where supplementary data corresponding to content recorded on a disc, for example, subtitle data or dubbed data corresponding to movie content, service data corresponding to other kinds of content, or content such as a moving image or still image is downloaded as subsequent data (also called "trailer") from a server for use.

It should be noted that a content usage system that acquires subsequent data (trailer) from a server or the like, records the subsequent data onto a local storage section such as a hard disk, and plays back the subsequent data together with disc-recorded content is disclosed in, for example, Japanese Patent No. 3959725 and Japanese Unexamined Patent Application Publication No. 2003-140662.

AACS (Advanced Access Content System) exists as a standard for content usage control for a Blu-ray Disc®. This standard defines usage control of not only content that has been recorded on a disc but also of subsequent data stored on the local storage section as mentioned above.

When content recorded on a disc such as a Blu-ray Disc®, and subsequent data recorded on a local storage section such as a hard disk are to be played back together on a user apparatus, the playback process is performed by building a virtual file system (VFS) that combines the disc-stored content and the content stored on the local storage section such as a hard disk. Through this VFS-based playback process, playback can be performed in the same manner as if from a single medium.

At the time of this VFS building process, file names of subsequent data stored on the local storage section are converted into file names for VFS settings. When setting these subsequent-data files on the VFS, it is necessary to set the file names for VFS in such a way that the file names do not overlap on the VFS and allow reliable file identification.

That is, it is necessary to convert [File Name on Local Storage Section] into [File Name on VFS]. For this file name conversion process, the user apparatus holds a file name conversion table. This file name conversion table is called a manifest file (BUMF: Binding Unit Manifest File).

To perform playback on the user's information processing apparatus by using both content stored on a disc and content stored on a local storage section, it is necessary to build a virtual file system (VFS) by using a manifest file (BUMF: Binding Unit Manifest File) serving as a file name conversion table.

It is not necessarily the case that subsequent data (trailer) to be provided to the user apparatus from the server has been determined at the time of manufacture of a disc. It is often the case that subsequent data is created and provided to the user after the user's purchase of the disc. Also, in some cases, new subsequent data is sequentially created. That is, in some cases, new subsequent data is sequentially provided to the user with the elapse of time after the release of the disc in the sequence of first subsequent data,
second subsequent data,
third subsequent data,
and so on.

Subsequent data to be provided to the user is not limited to content files storing content substance data such as an AV stream but in some cases also includes updated content files, usage control information files, CPS unit key files, and the like corresponding to disc-stored content. Further, usage control information files, CPS unit key files, and the like corresponding to the subsequent data are also included.

When the user apparatus has acquired subsequent data from the server, it is necessary to build an updated virtual file system (VFS) allowing use of the acquired subsequent-data files. When updating of the virtual file system (VFS) is incomplete, for example, when content files have been received as subsequent data but CPS unit key files corresponding to the content files have not been received, updating of the virtual file system (VFS) is incomplete. In such a case, the user apparatus is not able to perform content playback.

Therefore, it is necessary that the file set of subsequent data received from the server be a file set that allows complete updating of the virtual file system (VFS).

As described above, after provision of a disc to the user, subsequent data is provided from the server at various timings, for example, in the sequence of the first subsequent data, the second subsequent data, the third subsequent data, and so on. The file set included in the subsequent data at these timings varies in settings.

As a program for making access to the server from an information processing apparatus on the user side to execute acquisition of subsequent data, a program stored on a disc together with content is used in many cases. For example, a BD-J program, which is a Java® program set in correspondence to a Blu-ray Disc®, is recorded on the disc together with content. The user's information processing apparatus reads this program from the disc and executes the program.

Access and subsequent-data acquisition request to the server are executed in accordance with the descriptions of this program. Therefore, it is necessary that the program (BD-J program) be pre-recorded with information for acquiring files necessary for a complete update of the virtual file system (VFS).

However, in the actual process, creation of subsequent data is often performed after a disc on which a program (BD-J program) and content are recorded is provided to the user. Therefore, it is difficult to clearly determine a file set included in subsequent data, that is, a file set necessary for a complete update of the virtual file system (VFS), at the stage of program (BD-J program) creation which is executed before manufacture of the disc.

SUMMARY OF THE INVENTION

It is desirable to provide an information processing apparatus, an information processing system, an information recording medium, an information processing method, and a program with which, even at a time when the file set included in subsequent data is still undetermined, a program recording predetermined information is recorded onto a disc, and a request for subsequent data is made to the server from the user apparatus by applying the program, thereby making it possible to receive all of the file set necessary for performing an update of a virtual file system (VFS).

According to an embodiment of the present invention, there is provided an information processing apparatus including: a communicating section that executes communication with a server; a local storage section that stores subsequent data acquired from the server; and a data processing section that executes an acquisition process of the subsequent data, and a data playback process using data stored on a disc and the subsequent data stored on the local storage section, in which the data processing section builds a virtual file system for reading data stored on the disc and the local storage section, at the time of the data playback process, and performs the acquisition process of the subsequent data by transmitting a package ID to the server at the time of the acquisition process of the subsequent data, the package ID being information specifying a package corresponding to a file set necessary for building or updating the virtual file system.

Further, in the information processing apparatus according to an embodiment of the present invention, the data processing section executes a program recorded on the disc to execute the acquisition process of the subsequent data, and performs the acquisition process of the subsequent data by transmitting a package ID recorded on the program to the server.

Further, in the information processing apparatus according to an embodiment of the present invention, the data processing section executes a server-provided program provided from the server to execute the acquisition process of the subsequent data, and performs the acquisition process of the subsequent data by transmitting a package ID recorded in the server-provided program to the server.

Further, in the information processing apparatus according to an embodiment of the present invention, the data processing section performs the acquisition process of the subsequent data by transmitting a group ID to the server at the time of the acquisition process of the subsequent data, the group ID being information specifying a group corresponding to a file set necessary for building or updating the virtual file system and being information specifying a group corresponding to a file set including part of files forming the package.

Further, according an embodiment of the present invention, there is provided a server including: a communicating section that executes communication with a user apparatus; a database that stores subsequent data to be provided to the user apparatus; and a data processing section that receives a subsequent-data acquisition request from the user apparatus via the communicating section, and transmits subsequent data acquired from the database to the user apparatus, in which the data processing section performs a process of receiving a package ID as a requested-data identifier contained in the subsequent-data acquisition request from the user apparatus, extracting a file set associated with the package ID from the database, and transmitting the file set to the user apparatus, the package ID is information specifying a package corresponding to a file set necessary for building or updating a virtual file system that is set in the user apparatus to read data stored on a disc and a local storage section, and the data processing section performs a process of applying the package ID as information for selecting data to be transmitted to the user apparatus.

Further, in the server according to an embodiment of the present invention, the data processing section receives a group ID from the user apparatus, and performs a process of applying the group ID as information for selecting data to be transmitted to the user apparatus, the group ID being information specifying a group corresponding to a file set necessary for building or updating the virtual file system and being information specifying a group corresponding to a file set including part of files forming the package.

Further, according to an embodiment of the present invention, there is provided an information processing system including: an information processing apparatus in which a disc is mounted and which performs a playback process of data stored on the disc; and a server that receives a data acquisition request from the information processing apparatus, and performs a provision process of subsequent data to the information processing apparatus, in which the information processing apparatus performs a data playback process by building a virtual file system for reading the data stored on the disc and subsequent data stored on a local storage section, and performs an acquisition process of the subsequent data by transmitting a package ID to the server at the time of the acquisition process of the subsequent data, the package ID being information specifying a package corresponding to a file set necessary for building or updating the virtual file system, and the server receives the package ID contained in a subsequent-data acquisition request from the information processing apparatus, extracts a file set associated with the package ID from a database, and transmits the file set to the information processing apparatus.

Further, according to an embodiment of the present invention, there is provided an information recording medium recording: content to be played back by an information processing apparatus; and a program for causing the information processing apparatus to execute an acquisition process of subsequent data from a server, in which the program is a program recording a package ID, and recording a sequence for causing the information processing apparatus to transmit the package ID to the server to execute the acquisition process of subsequent data, at the time of a data playback process in the information processing apparatus, the package ID being information specifying a package corresponding to a file set necessary for building or updating a virtual file system for reading data stored on the information recording medium and a local storage section.

Further, according to an embodiment of the present invention, there is provided an information processing method which is executed in an information processing apparatus, including: a subsequent-data acquiring step of a data processing section performing an acquisition process of subsequent data from a server; and a data playback step of the data processing section executing a data playback process using data stored on a disc, and subsequent data stored on a local storage section, in which the data playback step includes executing the data playback process by building a virtual file system for reading data stored on the disc and the local storage section, and the subsequent-data acquiring step includes performing the acquisition process of subsequent data by transmitting a package ID to the server, the package ID being information specifying a package corresponding to a file set necessary for building or updating the virtual file system.

Further, according to an embodiment of the present invention, there is provided an information processing method for a server that executes a provision process of subsequent data to a user apparatus, including: a subsequent-data providing step of a data processing section receiving a package ID as a requested-data identifier contained in a subsequent-data acquisition request from the user apparatus, extracting a file set associated with the package ID from a database, and transmitting the file set to the user apparatus, in which the package ID is information specifying a package corresponding to a file set necessary for building or updating a virtual file system that is set in the user apparatus to read data stored on a disc and a local storage section, and the subsequent-data providing step includes performing a process of applying the package ID as information for selecting data to be transmitted to the user apparatus.

Further, according to an embodiment of the present invention, there is provided a program for causing an information processing apparatus to execute information processing, the information processing including: a subsequent-data acquiring step of a data processing section performing an acquisition process of subsequent data from a server; and a data playback step of the data processing section executing a data playback process using data stored on a disc, and subsequent data stored on a local storage section, in which the data playback step includes executing the data playback process by building a virtual file system for reading data stored on the disc and the local storage section, and the subsequent-data acquiring step includes performing the acquisition process of subsequent data by transmitting a package ID to the server, the package ID being information specifying a package corresponding to a file set necessary for building or updating the virtual file system.

Further, according to an embodiment of the present invention, there is provided a program for causing a server to execute a provision process of subsequent data to a user apparatus, the provision process including: a subsequent-data providing step of a data processing section receiving a package ID as a requested-data identifier contained in a subsequent-data acquisition request from the user apparatus, extracting a file set associated with the package ID from a database, and transmitting the file set to the user apparatus, in which the package ID is information specifying a package corresponding to a file set necessary for building or updating a virtual file system that is set in the user apparatus to read data stored on a disc and a local storage section, and the subsequent-data providing step includes performing a process of applying the package ID as information for selecting data to be transmitted to the user apparatus.

With the configuration according to an embodiment of the present invention, when acquiring subsequent data from a server by a user apparatus, which performs a data playback process by building a virtual file system for reading subsequent data stored on a disc and a local storage section, the user apparatus transmits to the server a package ID that is information specifying a package corresponding to a file set necessary for building or updating the virtual file system. The server provides the set of files specified by the package ID to the user apparatus. The package ID can be set even when files of subsequent data have not been completed, so that even at a time when the structure of subsequent data is still undetermined, a program recording the package ID can be recorded onto the disc for provision to the user.

It should be noted that the program according to an embodiment of the present invention is a computer program that can be provided to a general-purpose computer system capable of executing a variety of program codes, via a recording medium or communication medium that is provided in a computer-readable format. By providing such a program in a computer-readable format, processes according to the program are realized on the computer system.

Other objects, features, and advantages of the present invention will become apparent from the following detailed description of embodiments of the present invention and the accompanying drawings. It should be noted that the term system as used in this specification refers to a logical collection of a plurality of devices, and is not limited to one in which the constituent devices are located within the same housing.

BRIEF DESCRIPTION OF THE DRAWINGS

FIG. 4 is a diagram illustrating a specific example of structure of a CPS unit key file;

FIG. 7 is a diagram illustrating an example of file conversion table stored in subsequent-data retrieval information;

FIG. 15 is a diagram illustrating a process example in which not only package IDs but also group IDs are used.

DESCRIPTION OF THE PREFERRED EMBODIMENTS

Hereinbelow, an information processing apparatus, an information processing system, an information recording medium, an information processing method, and a computer program according to an embodiment of the present invention will be described with reference to the drawings. The description will be given in accordance with the following topics.

1. Overview of Configuration and Processing of Information Processing Apparatus

2. Overview of Content Playback Process Using VFS and File Name Conversion Table (BUMF)

3. Packaging Process of Subsequent-Data File Set

4. Process Example using Group IDs as Package Subdivision Information

[1. Overview of Configuration and Processing of Information Processing Apparatus]

Figure 1:
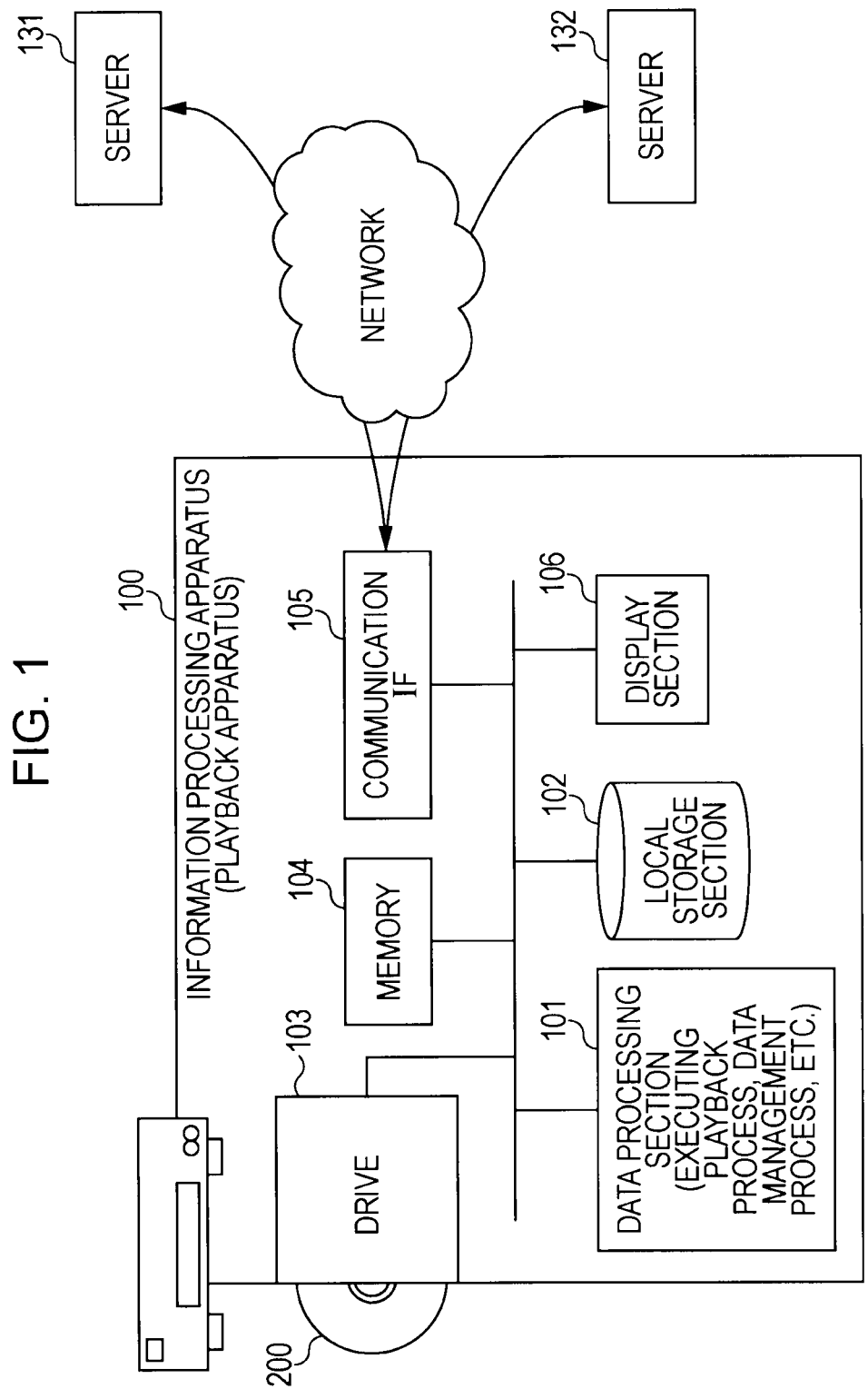
FIG. 1 is a diagram illustrating the configuration of an information processing apparatus according to an embodiment of the present invention.

First, a description will be given of an overview of the configuration and processing of an information processing apparatus according to an embodiment of the present invention. FIG. 1 is a diagram showing an information processing apparatus 100 such as a PC or a playback apparatus which executes a playback process of a disc (information recording medium) 200 such as a Blu-ray Disc®.

The information processing apparatus 100 has the following components:

a data processing section 101 having a program executing function, such as a CPU, which executes a content playback process, a subsequent-data (trailer) acquisition process, a virtual file system (VFS) building process, a content usage process, and the like;

a local storage section 102 configured by, for example, a hard disk or a flash memory, which stores subsequent data (trailer) and management data such as data downloaded from servers 131 and 132 or user-generated data, as data corresponding to content stored on a disc 200;

a drive 103 that performs input/output of data to/from the disc 200;

a memory 104 configured by a ROM, a RAM, or the like which is used as a program execution area, a parameter storage area, and the like;

a communication interface 105 that executes communication with, for example, a server via a network; and a display section 106 that displays content or content information.

The information processing apparatus 100 reads content stored on the information recording medium 100 via the drive 103 from the disc 200, and performs a playback process of the content. This process is performed under the control of the data processing section 101. The disc 200 is, for example, a ROM medium on which content is recorded in advance.

The information processing apparatus 100 acquires subcontent that can be used together with playback of content stored on the disc 200, for example, subtitle data or dubbed data in a case where the content stored on the disc 200 is movie content, and other subsequent data (trailer) such as service data corresponding to the content stored on the disc 200, via the servers 131 and 132, and stores the acquired data onto the local storage section 102 configured by, for example, a hard disk or a flush memory.

Subsequent data to be stored onto the local storage section 102 is, for example, data acquired in correspondence to one of pieces of content stored on the disc 200. At the time of playing back content stored on the disc 200, playback of subsequent data acquired from the server and stored onto the local storage section 102 can be executed at the same time.

In this playback process, the playback process is performed by building, for example, a VFS (Virtual File System) which combines content stored on a disc, and content stored on a local storage section such as a hard disk. Through this VFS-based playback process, playback can be performed in the same manner as if from a single medium. Details of the VFS-based playback process will be given later.

The data processing section 101 generates or updates management information or descriptive information related to subsequent data as necessary at the time of recording subsequent data, and records the information onto the local storage section 102. The data processing section 101 records the subsequent data and the management information or descriptive information in a directory for subsequent data which is set in the local storage section 102.

The data processing section 101 manages subsequent data in units of management each called a binding unit (BU). The binding unit (BU) is set as a unit containing subsequent data generated or acquired subsequently in correspondence to content stored on the disc 200, such as content downloaded from a server or user-generated data. Many kinds of subsequent data can be played back together with playback of content stored on the disc 200.

When playing back content stored on the disc 200 and subsequent data stored on the local storage unit 102 together, the data processing section 101 performs the playback process by building a virtual file system (VFS) as described above. At this time, the data processing section 101 performs a file name conversion process of the subsequent data stored on the local storage section 102. A table used for this conversion process is called a file name conversion table (manifest file (BUMF)). A manifest file records subsequent-data management information on a per-management unit (binding unit (BU)) basis, and is also called binding unit manifest file (BUMF).

While basically one manifest file (BUMF) is set for one management unit (BU), it is also allowed to record management information for a plurality of management units within a single manifest file (BUMF). A specific example of the manifest file (BUMF) and an example of its use will be described later.

Figure 2:
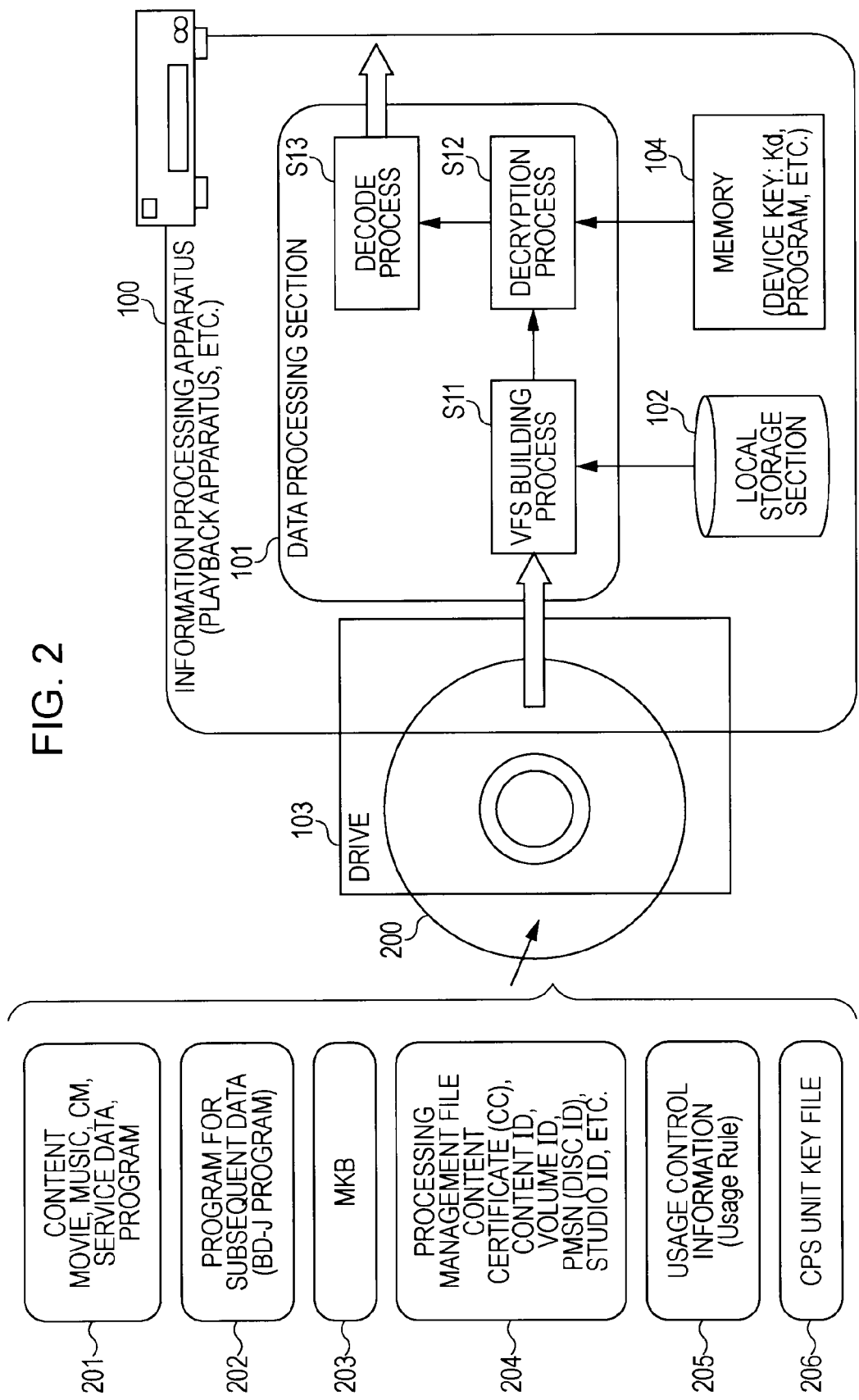
FIG. 2 is a diagram showing data stored on an information recorded medium, and an example of content playback process in an information processing apparatus (playback apparatus)

Next, referring to FIGS. 2 and 3, a description will be given of an example of data stored on the information recording medium, and an example of content playback process performed by the information processing apparatus. FIG. 2 is a diagram showing an example of data stored on the disc 200, and an example of content playback process performed by the information processing apparatus (playback apparatus) 100. This example shows an example of information stored on a ROM disc as a disc on which content has been already stored. The information processing apparatus 100 is configured by, for example, various kinds of information processing apparatus such as a PC or a playback-only apparatus, and has the drive 103 that executes a data reading process from the disc 200.

The ROM disc as the disc 200 is, for example, an information recording medium such as a Blu-ray Disc® or a DVD, which is an information recording medium storing valid content which is manufactured at a disc manufacturing plant under the permission of a valid content right holder, for example.

As shown in FIG. 2, the disc 200 stores the following data:
content 201;
a program for subsequent data 202, which is a program applied to a content download process from a server or the like described later;
an MKB (Media Key Block) 203 as an encryption key block generated on the basis of a tree-structure key distribution scheme representing one mode of broadcast encryption scheme;
a processing management file 204 containing a content certificate (CC: Content Cert.) that certifies the validity of content or the like stored on the disc 200, a content ID serving as a content identifier, a volume ID that is set as identification information for each individual information recording medium or for each predetermined number of information recording media, and PMSN (Pre-recorded Media Serial Number) or the like which is equivalent to a media ID serving as disc-specific identification information;
usage control information (Usage Rule) 205 including CCI (Copy Control Information) and the like serving as content copy/playback control information; and
a CPS unit key file 206 storing a CPS unit key, which is an encryption key set for each content management unit (CPS unit) serving as a content usage management unit.

It should be noted that the program for subsequent data 202 is, for example, a program configured by a Java® application program. A Java® application program stored on a Blu-ray Disc® is also called a BD-J program (or a BD-J application). Hereinbelow, an overview of information stored on the disc 200 will be described.

(1) Content 201

Various kinds of content are stored on the disc 200. Examples of these kinds of content include an AV (Audio Visual) stream of moving image content such as HD (High Definition) movie content or the like which is high-definition moving image data, a game programs, an image file, audio data, text data, and a Java® application program.

Of these kinds of content, for example, movie content as main content is specific AV format standard data, and is recorded as encrypted data in accordance with the AACS (Advanced Access Content System) standard, which is a content copyright protection technology standard. That is, content is divided into units (CPS units), and each of the units is recorded onto a disc as encrypted content to which a unit key (CPS unit key) corresponding to each unit has been applied. Details of the content recording format will be described later with reference to FIG. 3.

Further, for example, a game program, an image file, audio data, text data, and the like are stored as sub-content in the content 201 in some cases. In some cases, sub-content is data that does not comply with a specific AV data format.

Both the main content and sub-content include various kinds of content such as music data, image data such as a moving image or a still image, a game program, a WEB content, and the like. These kinds of content include various forms of information, such as content information that can be used solely with data from the disc 200, and content information which can be used with a combination of data from the disc 200 and data provided from a server connected to a network.

(2) Program for Subsequent Data 202

The program for subsequent data 202 is a program that is applied to a process of downloading subsequent data corresponding to content stored on a disc from a server, or the like. The program for subsequent data 202 is, for example, a program configured by a Java® application. In the case of the Blu-ray Disc®, a BD-J program, which is a Java® program set in correspondence to the Blu-ray Disc®, is used.

Subsequent data downloaded from a sever by applying the BD-J program include various files, such as subtitle data, service video content, and a preview corresponding to content stored on the disc, and further, updated usage control information and CPS unit files. In some cases, an updating program for the BD-J program itself also serves as data to be downloaded.

(3) MKB

The MKB (Media Key Block) 203 is an encryption key block generated on the basis of a tree-structured key distribution scheme representing one mode of a broadcast encryption scheme. The MKB 203 is a key information block that allows a media key (Km), which is a key necessary for decrypting content, to be acquired only by a process (decryption) based on a device key (Kd) stored in the information processing apparatus of a user with a valid license. This represents an application of an information distribution scheme according to a so-called hierarchical tree structure, whereby acquisition of a media key (Km) is possible only if a user device (information processing apparatus) has a valid license, and acquisition of a media key (Km) is not possible with an invalidated (revoked) user device.

A management center that performs management of an MKB can change a device key used for encryption of key information to be stored in the MKB, thereby generating an MKB having a structure such that decryption is not possible, that is, acquisition of a media key necessary for content decryption is not possible with a device key stored in a specific user device. Therefore, by rejecting (revoking) unauthorized devices at arbitrary timing, it is possible to provide encrypted content that can be decrypted only with a device having a valid license.

(4) Processing Management File

The processing management file 204 contains the following data, for example.

A content certificate (CC: Content Cert.) that certifies the validity of disc-stored content.

A content ID as an identifier of content stored on the disc 200.

A volume ID that is set as identification information for each individual information recording medium or for each predetermined number of information recording media.

A PMSN (Pre-recorded Media Serial Number) that is equivalent to a media ID serving as disc-specific identification information.

In addition, the processing management file 204 contains a disc ID as identification information of the disc 200, and a studio ID as an identifier of an editing studio for content stored on the disc 200.

(5) Usage Control Information (Usage Rule)

The usage control information (Usage Rule) 205 includes, for example, copy/playback control information (CCI), that is, copy restriction information or playback restriction information which is used for usage control corresponding to the encrypted content 201 stored on the disc 200, content acquired subsequently from a server, or the like. This copy/playback control information (CCI) allows various settings, such as being set as information specific to each CPS unit set as a content management unit, or being set in correspondence to a plurality of CPS units.

(6) CPS Unit Key File

As described above, encrypted content stored on the disc 200 is divided into CPS units set as content management units, and is encrypted with an encryption key applied on a unit-by-unit basis. To execute a playback process, it is necessary for the information processing apparatus to determine a CPS unit to which the content to be played back belongs, and performs a decryption process by using a CPS unit key serving as an encryption key corresponding to the determined CPS unit. A file storing data for acquiring this CPS unit key is a CPS unit key file. It should be noted that to playback content, it is necessary to use not only a CPS unit key but also other various kinds of key information, key generation information, and the like.

FIG. 2 shows the details of data stored on the disc 200, and an overview of processing in the information processing apparatus 100 that plays back together content stored on the disc 200 and content stored on the local storage unit 102, for example, content acquired subsequently from a server. The information processing apparatus has the drive 103 that executes a reading process of data stored on the information recording medium.

First, in step S11, the data processing section 101 of the information processing apparatus 100 performs a process of building a virtual file system (VFS). That is, the data processing section 101 builds a virtual file system (VFS) that combines content stored on the disc 200, and content stored on the local storage section 102 such as a hard disk. By this VFS-based playback process, playback can be performed in the same manner as if from a single medium. Thereafter, in steps S12 and 13, a content decryption process and decode (for example, MPEG decode) process are performed to execute content playback.

The memory 104 is configured by a ROM or a RAM used as a program execution area, a data storage area, or the like, and stores a device key [Kd] applied to a content decryption process, a program executing various processes, and the like. When decrypting content, the information processing apparatus 100 generates a key to be applied to decryption of content on the basis of data stored in the memory 104, and data read from the disc 200, and executes a decryption process of the encrypted content to be played back.

Next, referring to FIG. 3, a description will be given of an example of the format of content stored on the information recording medium. To realize usage control that differs for each unit, at least part of content stored on the information recording medium is assigned a key that differs for each unit, and subjected to an encryption process before being stored. That is, content is divided into content management units (CPS units), which are individually subjected to an encryption process and usage management.

For use of content such as playback of encrypted content, first, it is necessary to acquire a CPS unit key assigned to each unit, and further, data processing based on a predetermined decryption process sequence is executed by applying other necessary keys, key generation information, and the like to perform playback of the content. Referring to FIG. 3, a description will be given of how content management units (CPS units) are set.

Figure 3:
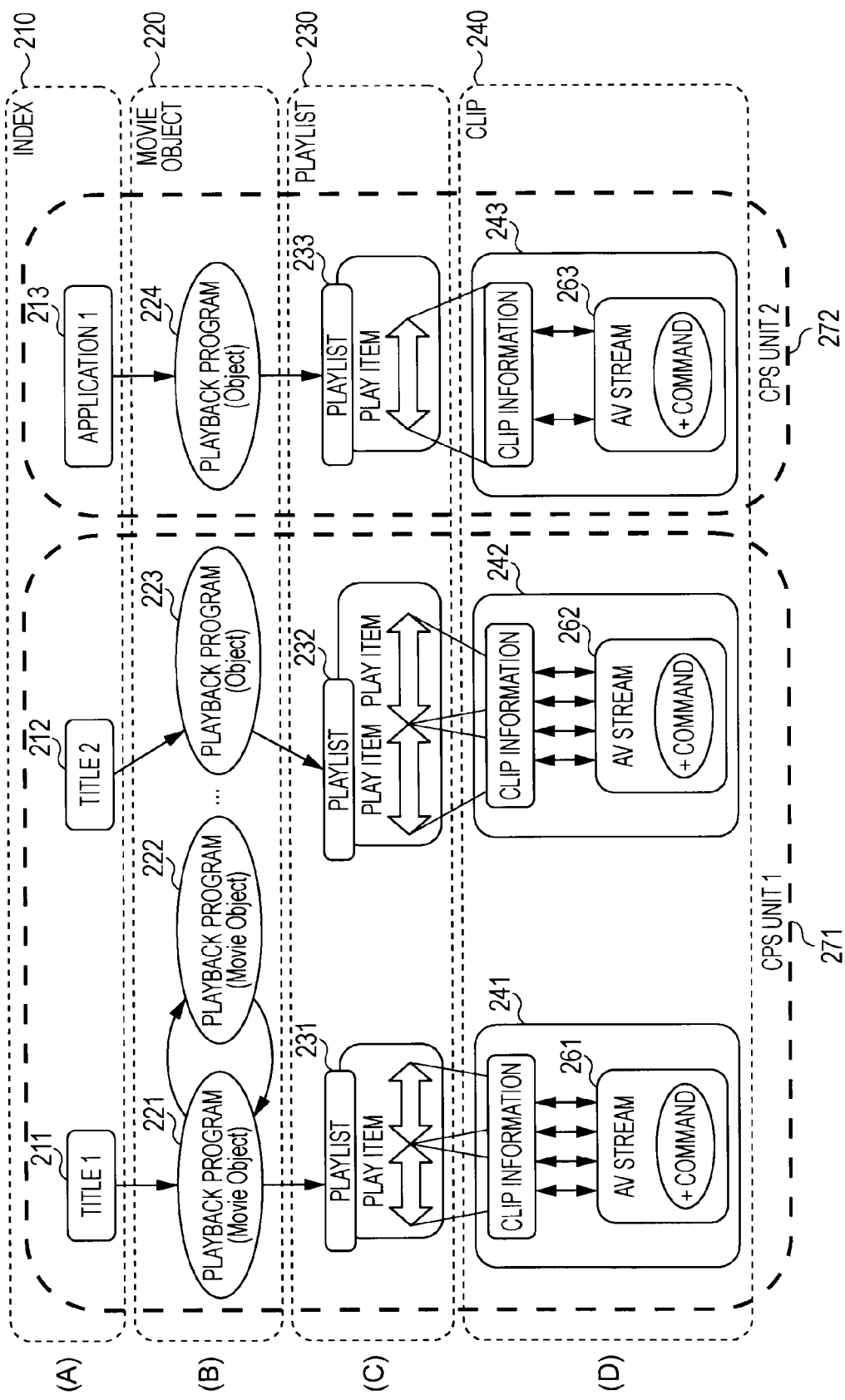
FIG. 3 is a diagram illustrating an example of format of content stored on an information recording medium.

As shown in FIG. 3, content has a hierarchical structure made up of (A) index 210, (B) movie object 220, (C) playlist 230, and (D) clip 240. Upon specifying an index such as a title to be accessed by a playback application, for example, a playback program associated with the title is specified, and a playlist defining the playback order of content or the like is selected in accordance with the program information of the specified playback program.

A playlist includes play items as playback-target-data-specifying information. On the basis of clip information serving as a playback section defined by a play item contained in a playlist, an AV stream or command serving as content real data is selectively read out, thereby performing playback of the AV stream or an execution process of the command. It should be noted that there are a large number of playlists and play items, each of which is associated with a playlist ID and play item ID serving as identification information.

It should be noted that the format shown in FIG. 3 is the format of encrypted content which complies with the AACS specification, and it is not necessary for all of the content 201 stored on the disc to be data that complies with this format. Various kinds of content such as commercial content and service content can be recorded on the disc, other than encrypted data recorded in compliance with this format. In some cases, these kinds of data are recorded on the disc as non-encrypted content, and use of a playlist is possible also for such content. In addition, use of a playlist is possible also for playback of a Java® program.

While the playlist settings shown in FIG. 3 are all directed to the example of playlist that specifies playback of only an AV stream as encrypted data, other than this, it is also possible to set a playlists for playing back AV streams that complies with the AACS specification, and content that is unencrypted data, and the like. When a user plays back content, playback is performed by specifying a title. At this time, a playback program is selected upon the user's specifying of the title, a playlist is selected by the playback program, and one or a plurality of pieces of playback content are selected sequentially by the selected playlist, thereby performing playback.

FIG. 3 shows two CPS units within encrypted content included in the content 201 recorded on the disc 200. These CPS units form a part of content stored on the information recording medium. A CPS unit 1 (271) and a CPS unit 2 (272) are each a CPS unit that is set as a unit containing a title serving as an index, a movie object serving as a playback program file, a playlist, and a clip containing an AV stream file serving as content real data.

The content management unit (CPS unit) 1 (271) contains a title 1 (211), a title 2 (212), playback programs 221 to 223, playlists 231 and 232, and clips 241 and 242. At least AV stream data files 261 and 262 representing the real data of content contained in the two clips 241 and 242 are data to be encrypted and, as a rule, are set as data encrypted with a CPS unit key (Ku1) that is an encryption key set in association with the content management unit (CPS unit) 1 (271).

The content management unit (CPS unit) 2 (272) contains an application 1 (213) serving as an index, a playback program 224, a playlist 233, and a clip 243. An AV stream data file 263 representing the real data of content contained in the clip 243 is encrypted with a CPS unit key (Ku2) that is an encryption key set in association with the content management unit (CPS unit) 2 (272).

For example, in order for the user to execute a playback process of an application file or content corresponding to the content management unit 1 (271), it is necessary to acquire a unit key: Ku1 as an encryption key set in association with the content management unit (CPS unit) 1 (271) and execute a decryption process. To execute a playback process of an application file or content corresponding to the content management unit 2 (272), it is necessary to acquire a unit key: Ku2 as an encryption key set in association with the content management unit (CPS unit) 2 (272) and execute a decryption process.

A specific example of structure of a CPS unit key file will be described with reference to FIG. 4. FIG. 4 shows the structure of a CPS unit key file in the form of a table. As shown in FIG. 4, the data structure of a CPS unit key file is such that the CPS unit key file is divided for each piece of index information such as a title, which is associated with a content management unit number (CPS unit number) and an encrypted CPS unit key [Kun] corresponding to each index.

On the basis of the unit number (CPS unit number) set to each CPS unit, the information processing apparatus executing content playback acquires the corresponding CPS unit key and executes a decryption process of the CPS unit that is encrypted content.

[2. Overview of Content Playback Process Using VFS and File Name Conversion Table (BUMF)]

As described above, when playing back content stored on the disc 200 and subsequent data stored on the local storage unit 102 together, the data processing section 101 of the information processing apparatus 100 which executes a content playback process performs the playback process by building a virtual file system (VFS). At this time, the data processing section 101 performs a file name conversion process of the subsequent data stored on the local storage section 102. A table used for this conversion process is the file name conversion table (manifest file (BUMF)). Hereinbelow, a description will be given of an overview of a content playback process using the VFS and the file name conversion table (BUMF).

Figure 5:
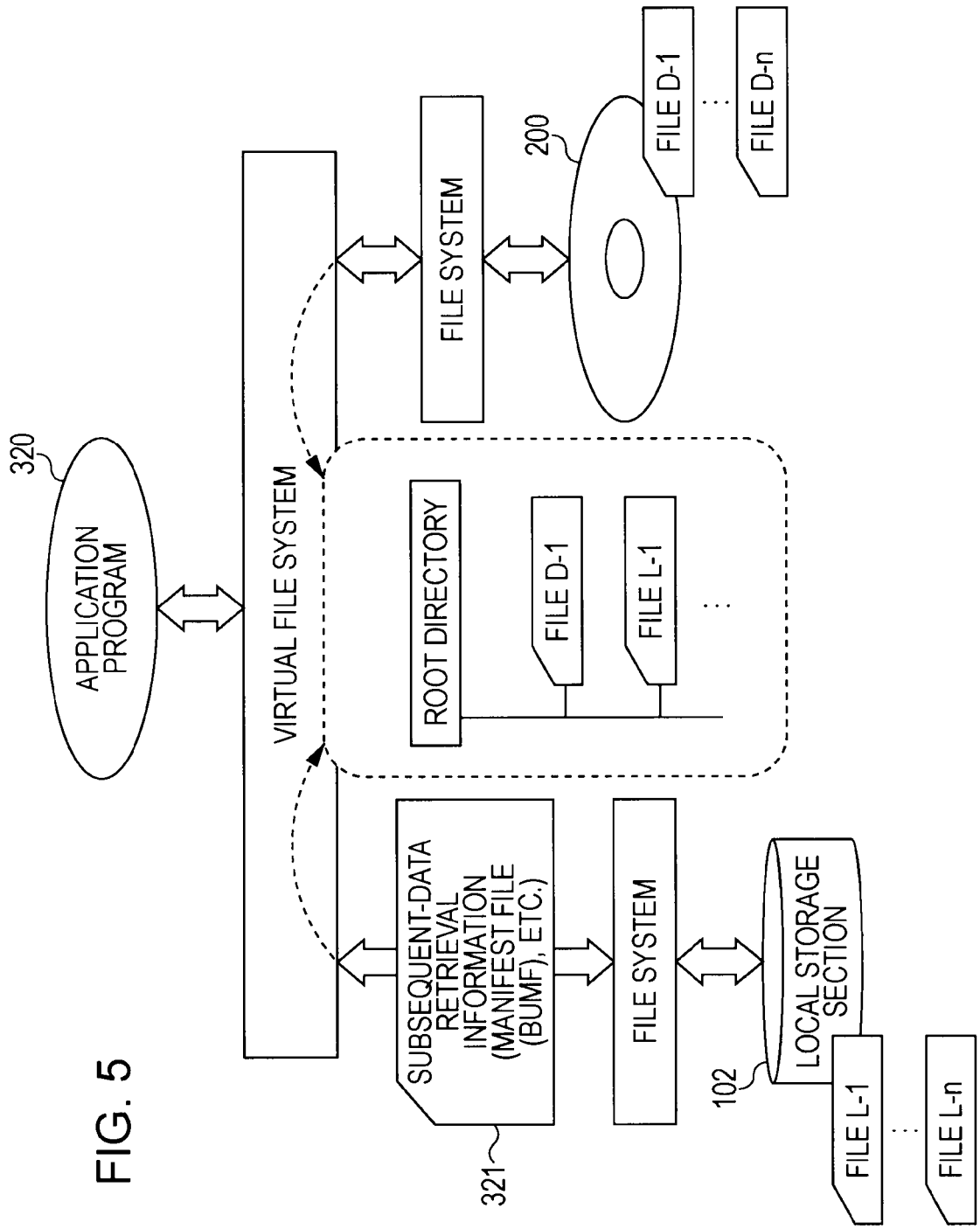
FIG. 5 is a diagram illustrating a virtual file system generated in an information processing apparatus.

Referring to FIG. 5, a description will be given of the virtual file system (VFS) that is set in a case where content stored on the disc 200, and subsequent data stored on the local storage section 102 such as a hard disk are to be played back together. For example, if content stored on the disc 200 is movie content in French, and if subsequent data stored on the local storage section 102 such as a hard disk is Japanese subtitle data corresponding to the movie content, by playing back both the data together, a movie with Japanese subtitles can be played back.

To perform playback of such composite content, the information processing apparatus 100 virtually combines a directory and files including a subsequent-data management file stored on the local storage section 102 with a directory and files on the disc 200. That is, the information processing apparatus 100 sets a virtual file system (VFS). In this virtual-file-system (VFS) setting process, data files on the disc and the corresponding subsequent-data files on the local storage section are set as files on a single virtual directory. This process enables fast access to files stored on different recording media.

An application program 320 shown in FIG. 5 is an application program that executes a playback process or the like in the information processing apparatus 100, such as a movie object or a subsequent-data playback management program (BD-J application). The application program 320 operates files recorded on the disc 200 and files recorded on the local storage section 102 via the virtual file system. The application program 320 acquires, via the virtual file system, necessary subsequent-data files by using subsequent-data retrieval information 321, which is retrieval information for files recorded on the local storage section 102.

The virtual file system plays a role of concealing differences among recording media (file systems) with respect to the application program 320. Therefore, the application program 320 can operate files recorded on respective recording media by using the same API, without being aware of the differences among the recording media on which the files are recorded.

For example, the virtual file system is created by merging the file system of a disc and the file system of the local storage section 102 when the disc is mounted in an apparatus, or when executing an application program. The created virtual file system (VFS) is stored in the memory of the information processing apparatus 100. The virtual file system (VFS) is updated every time a directory or a file recorded on the local storage section 102 is changed by acquisition of new subsequent data (trailer) or the like.

As described above, to play back content stored on the disc 200 and subsequent data (trailer) stored on the local storage section 102 together, it is necessary to set a virtual file system (VFS).

As described above, subsequent data (trailer) acquired by the user's information processing apparatus from a server is not limited to a content file storing the substance of content such as a movie, but is made up of various files such as a CPU unit key file or a usage control information file.

Figure 6:
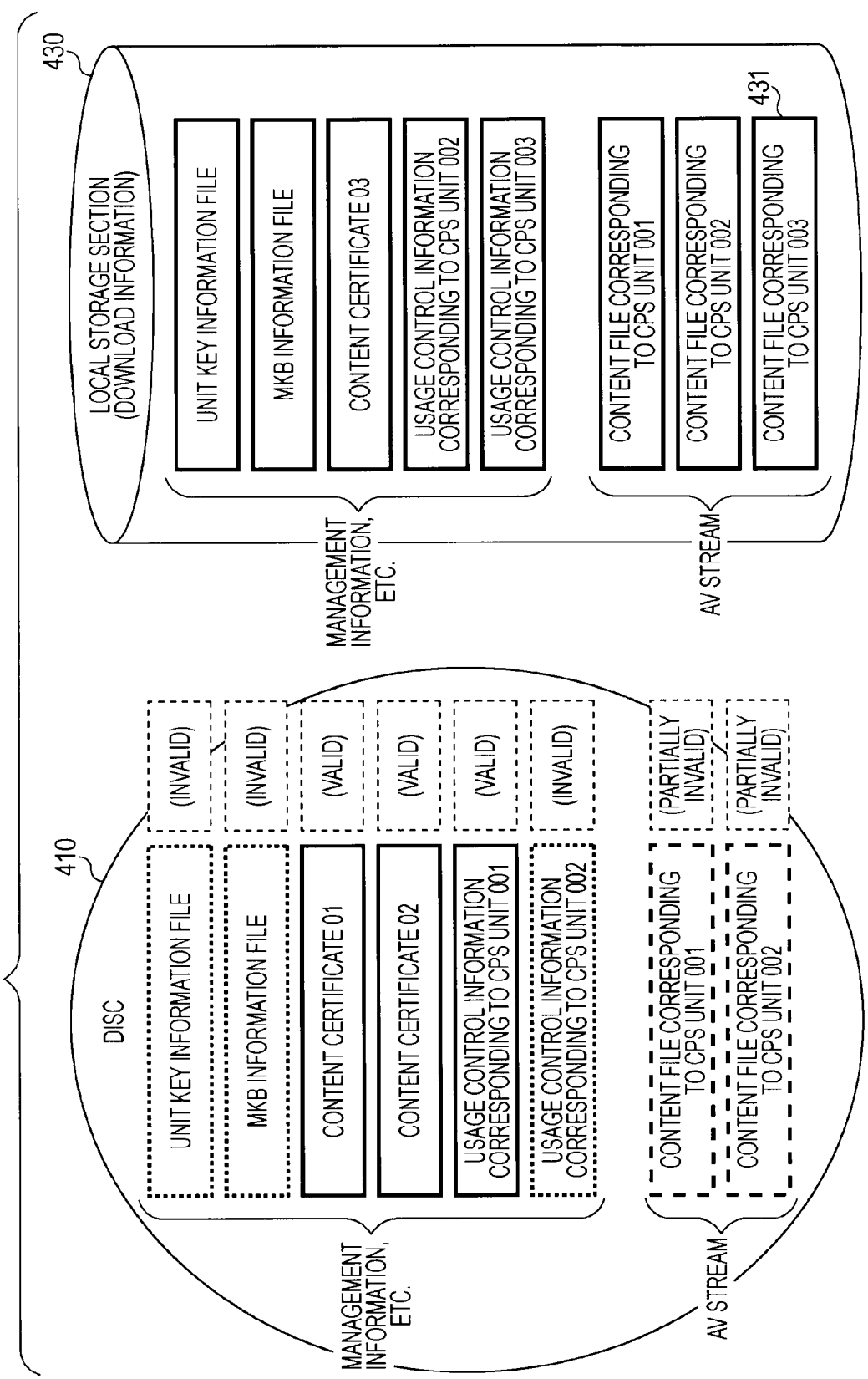
FIG. 6 is a diagram illustrating an example of structure of data stored on a disc and on a local storage section of an information processing apparatus.

FIG. 6 shows an example of data stored on a disc 410 mounted in the user's information processing apparatus, and subsequent data (trailer) stored on a local storage section 430 such as a hard disk within the user's information processing apparatus.

FIG. 6 shows the structure of the disc 410, and a plurality of files stored on the local storage section 430. The files include a group of files containing management information and the like, and a group of AV stream files containing the substance data of AV content such as a movie. A plurality of content files each named [Content File corresponding to CPU Unit XXX] are set as the substance of content in the AV stream files. As described above, content is divided by CPS units.

The group of files containing management information and the like stores [Unit Key Information File], which is a file of an encryption key applied to playback of content, [MKB Information File], [Content Certificate File] storing a content certificate applied to verification of the validity of content, and [Usage Control Information File corresponding to CPS Unit XXX] storing usage control information corresponding to each CPS unit.

As shown in FIG. 6, there are cases when some of the files recorded on the disc 410 become [invalid] or [partially invalid]. This corresponds to a case when an update file for a file recorded on the disc has been downloaded from the server. When using an update file downloaded from the server and recorded onto the local storage section 430, the file stored on the disc is set as invalid or partially invalid so that the disc is not used.

For example, when replacing a part of data stored on the disc by subsequent data (trailer) stored on the local storage unit 430 of the user's information processing apparatus and using the resulting data, it is necessary to set an updated virtual file system (VFS) with the corresponding file replaced.

When updating of the virtual file system (VFS) is incomplete, it becomes difficult to perform content playback.

Data to be downloaded from the server is not only a replacing data file corresponding to a file stored on a disc. In some cases, such data is new content not recorded on the disc 410. For example, [Content File corresponding to CPS Unit 003] 431 shown in FIG. 6 is a content file storing new content not recorded on the disc 410.

In this way, the user's information processing apparatus downloads various files from the server as subsequent data (trailer). The downloaded files are stored onto the local storage section 430 such as a hard disk of the information processing apparatus. The user's information processing apparatus builds the virtual file system (VFS) described above with reference to FIG. 5, by using files stored on the disc 410 and files stored on the local storage section 430, and executes a content playback process by selectively reading files stored on the two media.

In the case of a content playback process performed by building a virtual file system (VFS), it is necessary to perform a file name conversion process of subsequent data stored on the local storage section. That is, a file name conversion process is necessary so that a file stored on the local storage section can be read in the same manner as reading a file stored on the disc on the basis of a file name specified by a playback program.

A table applied to this file name conversion process is the file name conversion table (manifest file (BUMF)). The structure of the file name conversion table (manifest file (BUMF)) will be described with reference to FIG. 7.

The user's information processing apparatus holds a file name conversion table [BUMF] in the local storage section, together with subsequent-data files acquired from the server or the like, and at the time of generating a VFS that is a virtual file system, the user's information processing apparatus references the file name conversion table, converts [File Name on Local Storage Section] into [File Name on VFS], and sets the resulting file name on the VFS.

The file name conversion table (BUMF) shown in FIG. 7 has a structure in which the respective entries of [File Name on Local Storage Section], [Studio ID], and [Converted File Name] are associated with each other. A studio ID is identification information of an editing entity that has performed editing of content. The file name conversion table (BUMF) has information for converting the file name of a file stored on the local storage section into a VFS file name for the virtual file system (VFS).

The [File Name on Local Storage Section] is the actual file name under which subsequent data is recorded onto the local storage section on which the subsequent data is to be stored. Each such file name is set in such a way that there will be no overlap.

When building a virtual file system, the information processing apparatus applies the file name conversion table to acquire a converted file name, and sets the acquired file name as a file name on the virtual file system. The information processing apparatus acquires the studio ID of the content to be played back, and on the basis of this ID, applies the file name conversion table to acquire a converted file name, and sets the acquired file name as a file name on the virtual file system.

For example, in the case of a file name on the local storage section: studio.STREAM.00001.m2ts, the converted file name is
    BDMV/STREAM/00001.m2ts.

This converted file name: BDMV/STREAM/00001.m2ts is a file name that can be used in a playback application.

In this way, by executing conversion of file names by applying the file name conversion table (BUMF), freely-assignable file names can be set in the directory of the local storage section 102, so files with non-overlapping, freely-assignable names can be set.

While the second and third entries from the bottom of the file conversion name table (BUMF) shown in FIG. 7 both have the following common [File Name on Local Storage Section]:
    studioC.STREAM.00002.m2ts,
the converted file name when the studio ID=1 is
    BDMV/STREAM/00002.m2ts,
and the converted file name when the studio ID=2 is
    BDMV/STREAM/00012.m2ts.
Thus, the file name is converted into different file names in accordance with the value of the studio ID. By performing a file name conversion process by applying the file name conversion table in this way, for example, these entries can be set as different files to be applied to different playback applications.

To perform strict usage management of subsequent data, file manipulation verifying data (BUSF: Binding Unit Signature File) is stored on the local storage section of the user's information processing apparatus. The file manipulation verifying data (BUSF) is a file that sets a signature generated by applying the secret key of a management server (for example, a subsequent-data providing server) to data forming BUMF.

A user apparatus that uses subsequent data first checks the validity of a manifest file (BUMF) by signature verification of file manipulation verifying data (BUSF). On the condition that this check has been done, the manifest file (BUMF) is used to execute conversion of the file names of subsequent data stored on the local storage section, thereby building a virtual file system (VFS).

[3. Packaging Process of Subsequent-Data File Set]

Next, a description will be given of a packaging process of a subsequent-data file set. As described above, subsequent data (trailer) acquired by the user's information processing apparatus from the server includes not only content files storing the substance of content such as a movie but also various files such as CPS unit key files and usage control information files.

To use these subsequent-data files, it is necessary to build a virtual file system (VFS) by executing conversion of file names by applying the file name conversion table (BUMF). If the generated virtual file system (VFS) is incomplete, for example, if some of necessary subsequent-data files are missing, it may not be possible to perform playback of content. For example, in a case when a content substance file storing an AV stream has been received from a server but a key file applied to the decryption process of content stored in the content substance file has not been received, it is not possible to use the content.

Thus, when the information processing apparatus on the user side receives subsequent data from a server, it is necessary that the set of received files contain all the files necessary for updating a virtual file system (VFS). That is, a single file set includes not only the substance data of subsequent data (for example, subtitle data or trailer) but also a key file corresponding to the substance data, a usage control information file corresponding to the substance data, a BUMF (Binding unit manifest file) including a file name conversion table corresponding to the substance data, a signature file for verifying the authenticity of the BUMF, and the like. It should be noted, however, that in cases such as when the substance data is non-encrypted data, the above-mentioned key file may not be necessary, and the structure of included files can vary depending on the file set corresponding to the substance data.

As described above, when the user's information processing apparatus makes access to a server providing subsequent data to execute an acquisition process of subsequent data, a program stored on the disc together with content is used. For example, a BD-J program, which is a Java® program set in correspondence to a Blu-ray Disc®, is recorded on the disc together with content. The user's information processing apparatus reads this program from the disc and executes the program. The program is executed in the data processing section 101 of the information processing apparatus shown in FIGS. 1 and 2.

The data processing section 101 of the information processing apparatus as a user apparatus executes access and subsequent-data acquisition request to the server in accordance with the descriptions of this program. If information related to a file set of subsequent data planned to be provided from a server is recorded in this program (BD-J program), and a subsequent-data acquisition request to the server is executed in accordance with the program, it is possible to acquire files necessary for updating the virtual file system (VFS).

However, there are also cases where creation of subsequent data is performed after the end of provision to the user of a disc in which a program (BD-J program) and content are recorded. Therefore, in practice, it is difficult to clearly define a complete set of files necessary for updating the virtual file system (VFS) at the stage of creation of the program (BD-J program).

To overcome this problem, according to an embodiment of the present invention, a package ID is set as identification information corresponding to the set of files necessary for updating the virtual file system (VFS).

At the time of performing an acquisition process of subsequent data, the data processing section 101 of the information processing apparatus performs the acquisition process of subsequent data by transmitting to the server a package ID, which is information specifying a package corresponding to the file set necessary for building or updating the virtual file system (VFS).

Figure 8:
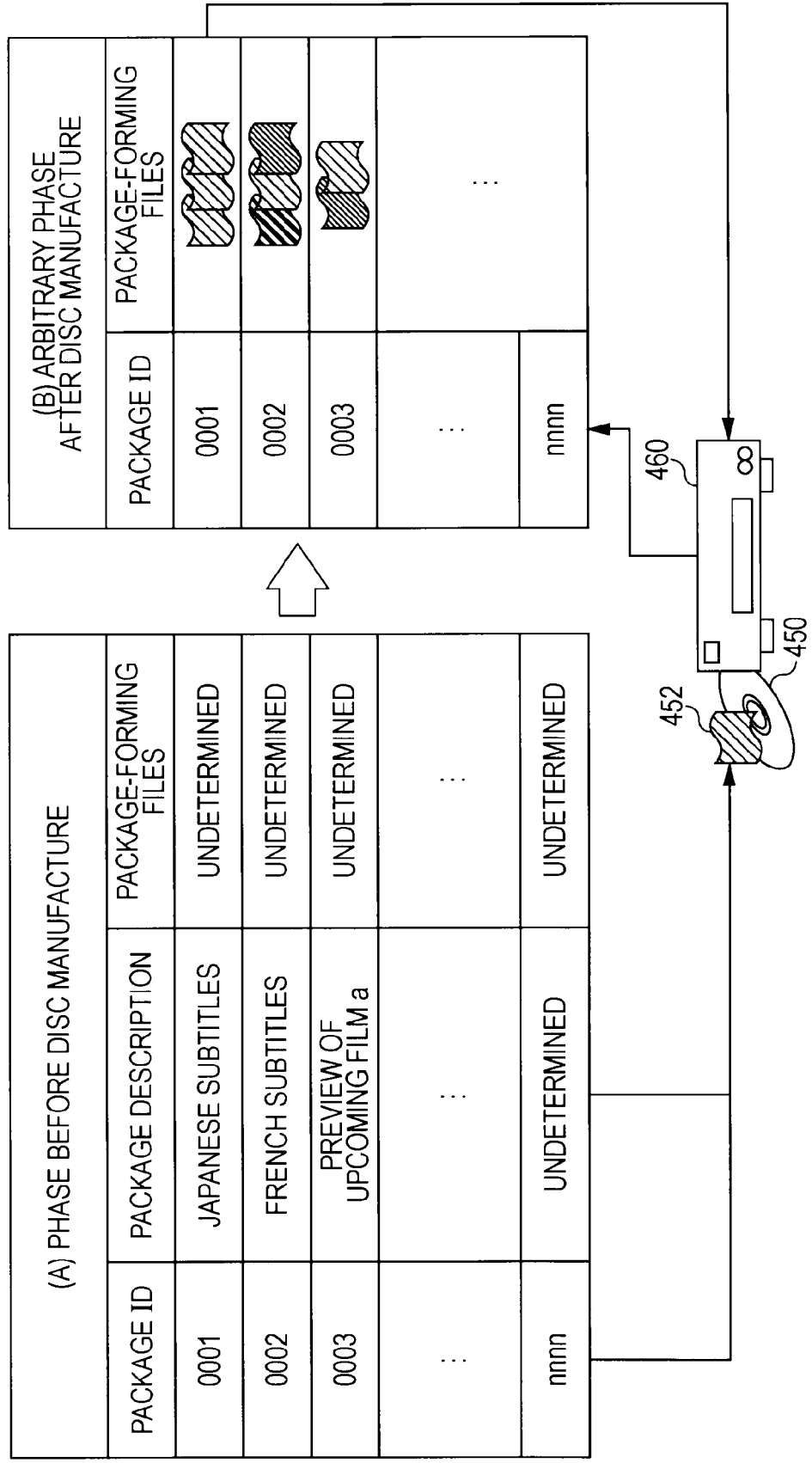
FIG. 8 is a diagram illustrating an example of setting process and use of package IDs.

A package ID is identification information that can be set even in a state when the specific file structure of a file set necessary for updating the virtual file system (VFS) has not been determined. Referring to FIG. 8, a description will be given of an example of how such a package ID is set.

FIG. 8(A) shows an example of package IDs set in a phase prior to disc manufacture. It is necessary that creation of content to be stored on a disc, and a program to be stored on the disc (BD-J program), that is, a program for executing an acquisition process of subsequent data from a server, be complete prior to disc manufacture.

However, in many cases, files to be provided from the server as subsequent data are incomplete at this point. However, as shown in the drawing, the general outline of data that is planned to be transmitted as subsequent data can be determined. As shown in the drawing, such data includes [Japanese Subtitles], [French Subtitles], and [Preview a of Upcoming Movie], and so on. Package IDs are set in advance in correspondence to the contents of these packages.

As shown in the drawing, package IDs are set as follows.
Package ID=0001: [Japanese Subtitles]
Package ID=0002: [French Subtitles]
Package ID=0003: [Preview a of Upcoming Movie]

At the time of setting these packages, specific files forming subsequent data contained in each package may not be complete yet.

Package IDs that can be outputted to the server when executing an acquisition request for subsequent data are recorded in a program (BD-J program) 452 to be stored on a disc 450, that is, the program 452 that executes a process of acquiring subsequent data from the server.

The program (BD-J program) 452 is used for executing a process of selecting a specific package ID in accordance with user-specified information, and outputting the selected package ID to the server from an information processing apparatus 460.

For example, when a user requests for Japanese subtitles, in accordance with the user's Japanese-subtitles-specifying information, a package ID corresponding to the Japanese subtitles is selected, and the selected package ID is outputted to the server from the information processing apparatus 460. The BD-J program 452 described above is recorded on the disc 450.

It should be noted that as in the case of the package ID [nnnn] shown in the last row of FIG. 8(A), the contents of a package may be set undetermined. For example, an undetermined package is set provisionally at the time of disc manufacture, and upon creation of arbitrary subsequent data, for example, advertisement data at a later date, this advertisement data is associated with the package ID [nnnn].

In a case when the user's information processing apparatus is to acquire subsequent data from the server, a list of subsequent data that can be provided can be transmitted from the server to the user apparatus. If correspondence information between the advertisement data and the package ID [nnnn] is contained in this list, transmission/reception of package data using the package ID [nnnn] also becomes possible.

FIG. 8(B) shows the correspondence between package IDs and files forming each package after subsequent-data files are completed. For example, the package ID=0001 represents a set of files necessary for playing back Japanese subtitles together with disc-stored content. Included in this file set are, for example, a content file storing the substance data of Japanese subtitles, a key file storing an encryption key, and a usage control information file storing usage control information.

On the basis of a package ID received from the information processing apparatus 460 of the user, the server can provide files forming a package corresponding to the package ID to the information processing apparatus 460 of the user. The files forming the package are set as a package including all the necessary files for building a non-defective, updated virtual file system (VFS).

According to the above-mentioned processing configuration, there is no program even if the file structure of subsequent data is undetermined at the stage of disc manufacture. That is, package IDs may be recorded on a program (BD-J program) that executes the process of acquiring subsequent data from the server, thereby creating a program that is set to transmit the package IDs to the server as information specifying subsequent data, and this program may be stored on a disc and provided to the user.

Figure 9:
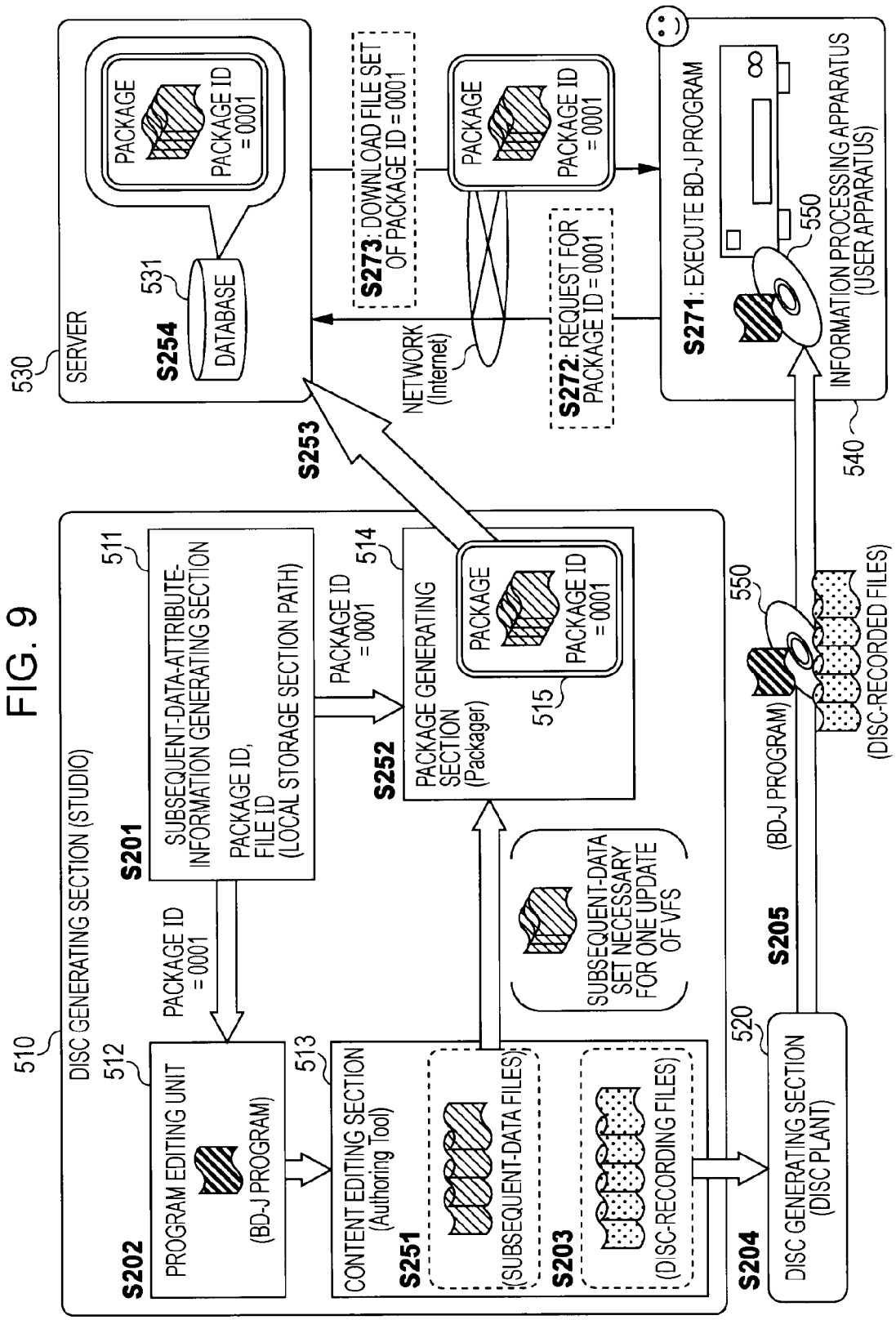
FIG. 9 is a diagram illustrating an example of configuration for performing a setting process and use of package IDs, and a process sequence.

Referring to FIG. 9, a description will be given of the configuration of processing to which such a package ID is applied, and the flow of the series of processing.

FIG. 9 shows:
a data generating section (studio) 510 that performs a process of creating content, subsequent data, a program (BD-J program), and the like;
a disc generating section (disc plant) 520 that receives data to be recorded onto a disc from the data generating section 510, and manufactures the disc;
a server 530 that executes a process of providing subsequent data; and an information processing apparatus 540 as a user apparatus that executes playback of the disc, an acquisition process of subsequent data, and the like.

The information processing apparatus 540 mounts and plays back a disc 550 manufactured by the disc generating section 520. The disc 550 records disc-recorded files containing movie content and the like generated by the data generating section (studio) 510, and a program (BD-J) program for executing an acquisition process of subsequent data.

The information processing apparatus 540 executes the program (BD-J program) recorded on the disc 550, and executes a request for subsequent data to the server 530 and acquires the subsequent data. When requesting for the subsequent data, the information processing apparatus 540 outputs a package ID as specifying information to the server 530. The server 530 provides to the information processing apparatus 540 of the user the files of a package set corresponding to the received package ID.

Figure 10:
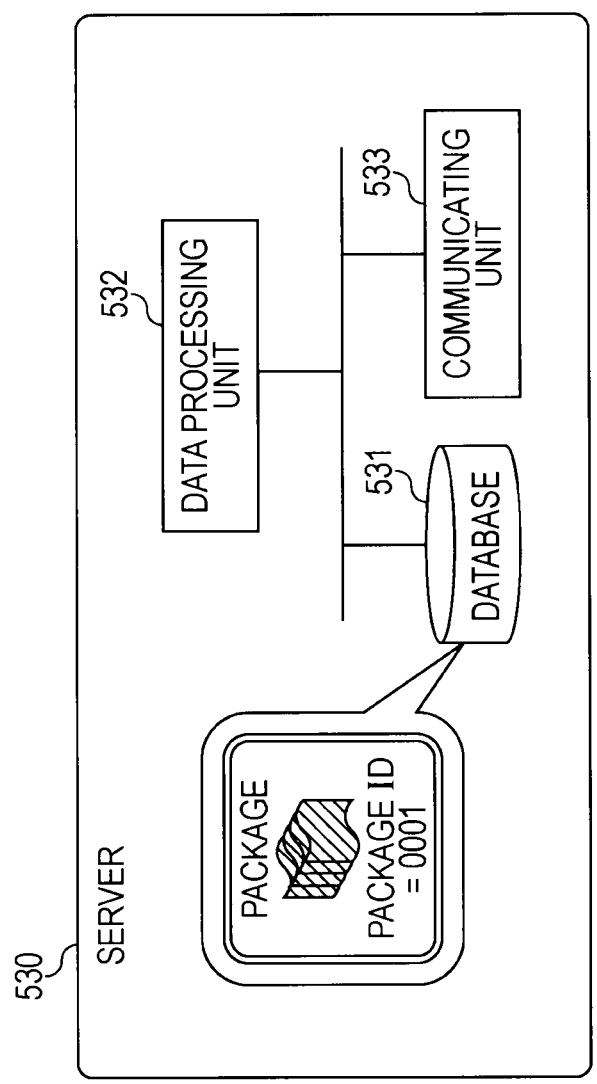
FIG. 10 is a diagram illustrating an example of configuration of a server that performs a subsequent data provision process.

An example of specific configuration of the server 530 is shown in FIG. 10. The server 530 has a communicating section 533 that executes communication with a user apparatus, a database 531 that stores subsequent data to be provided to the user apparatus, and a data processing section 532 that receives a subsequent-data acquisition request from the user apparatus via the communicating section 533, and transmits subsequent data acquired from the database 531 to the user apparatus.

The data processing section 532 performs a process of receiving a package ID as a requested-data identifier contained in the subsequent-data acquisition request from the user apparatus, extracting a file set associated with the package ID from the database 531, and transmitting the file set to the user apparatus. It should be noted that the package ID is information specifying a package corresponding to a file set necessary for building or updating a virtual file system, which is set in the user apparatus to read data stored on a disc and a local storage section. The data processing section 532 performs a process of applying the package ID as information for selecting data to be transmitted to the user apparatus. Further, there are also cases where the data processing section 532 performs a process that uses a group ID as information specifying a group corresponding to a file set including part of files forming a package. A detailed description of these processes will be given below.

Referring to FIG. 9, a description will be given of the flow of the series of processing along the progression of time. The processing proceeds in accordance with the following steps shown in the drawing.

Steps S201 to S205: Generation of recording data, disc manufacture, and provision to the user.

Steps S251 to S254: Generation of subsequent data and provision to the server.

Steps S271 to S273: Acquisition of subsequent data by the user apparatus from the server.

First, a description will be given of the process from the generation of recording data, disc manufacture, and provision of the disc to the user in steps S201 to S251.

Steps S201 to S203 are processes executed in the data generating section (studio) 510.

The data generating section 510 has a subsequent-data-attribute-information generating section 511, a program editing section 512, a content editing section 513, and a package generating section 514. It should be noted that the example of processing described here merely illustrates one example. While the following description is directed to the case in which the subsequent-data-attribute-information generating section 511, the program editing section 512, the content editing section 513, and the package generating section 514 are included within a single data generating section (studio) 510, these processing sections may belong to different data generating sections. Data generated by individual processing sections can be transmitted/received via a network, for example.

Step S201 is a process executed in the subsequent-data-attribute-information generating section 511. The subsequent-data-attribute-information generating section 511 executes generation of a package ID. As described above with reference to FIG. 8, a package ID is an ID that is set in correspondence to a specific subsequent-data set, that is, a complete file set of subsequent data necessary for updating the virtual file system (VFS). It should be noted, however, that at the point of setting this package ID, it is not necessary for the file set of subsequent data to have been generated, and the file set may be incomplete. The outline of the structure of a file set corresponding to each package ID, for example, "Japanese subtitles" or "French subtitles" may be either determined or undetermined at this point.

Package IDs set as follows may be determined.
Package ID=0001: [Japanese Subtitles]
Package ID=0002: [French Subtitles]
Package ID=0003: [Preview a of Upcoming Movie]
. . .
Package ID=nnnn: [Contents Undetermined]

While a package ID is set in correspondence to a file set of subsequent data necessary and sufficient for updating the virtual file system (VFS), in addition, a file ID may be determined in advance as a file identifier corresponding to each of files planned to be set within a package. Further, path information ([File Name in Local Storage Section] shown in FIG. 7), which is used when storing subsequent data onto the local storage section such as a hard disk of the information processing apparatus 540 as the user apparatus, may be also determined in advance. It should be noted, however, that there are also cases where it is possible to set file IDs and path information when the structure of files included in a package is determined but it is not possible to determine file IDs and path information when the file structure is undetermined. In such cases, file IDs and path information may not be determined.

As described above, the subsequent-data-attribute-information generating section 511 determines at least package IDs, and if possible, also determines file IDs and path information. The package IDs and other such determined information are provided to the program editing section 512 and the package generating section 514.

In step S202, the program editing section 512 creates a program (BD-J program) for executing an acquisition process of subsequent data. Package IDs that can be outputted to the server when executing an acquisition request for subsequent data are recorded in the program created at this time. These package IDs are provided from the subsequent-data-attribute-information generating section 511. These package IDs are set as follows.

Package ID=0001: [Japanese Subtitles]
Package ID=0002: [French Subtitles]
Package ID=0003: [Preview a of Upcoming Movie]
. . .
Package ID=nnnn: [Contents Undetermined]

The above-mentioned program includes a program for executing a process of transmitting a corresponding package ID to the server in accordance with user's subsequent-data selection/designation information.

The program editing section 512 provides the generated program (BD-J program) to the content editing section 513.

In step S203, the content editing section 513 creates disc-recorded files including data such as content to be recorded onto the disc. These disc-recorded files, and the program (BD-J program) received from the program editing section 512 are provided to the disc generating section (disc plant) 520. It should be noted that the disc-recorded files generated by the content editing section 513 are, for example, various kinds of files indicated as data stored on the disc 410 shown in FIG. 6, and are a group of files that are recorded on the disc provided to the user from the beginning.

In step S204, the disc plant 520 generates the disc 550 on which the disc-recorded files received from the content editing section 513 and the program (BD-J program) are recorded. In step S205, the disc 550 is provided to a user via a distributor or the like.

The foregoing completes the description of the process from steps S201 to S205, and represents a sequence related to the process of recording-data generation, disc manufacture, and provision of the disc to the user.

Next, a description will be given of a process from generation of subsequent data to provision of the subsequent data to the server shown in steps S251 to S254.

Step S251 is a subsequent-data generating process executed in the content editing section 513 of the data generating section 510. In step S251, the content editing section 513 generates various pieces of subsequent data (trailer) corresponding to content recorded on the disc 550. For example, these pieces of subsequent data are content files containing subtitle data, movie previews, service data, and the like. Further, these pieces of subsequent data are unit key files, usage control information files, and the like corresponding to these pieces of content.

The content editing section 513 combines the generated subsequent-data files into a file set including files necessary and sufficient for enabling updating of the virtual file system (VFS), and provides the file set to the package generating section 514.

The package generating section 514 creates a package in which a package ID received from the subsequent-data-attribute-information generating section 511 is set with respect to the file set received from the content editing section 513. Further, in step S253, the package generating section 514 transmits the generated package to the server 530 that performs a process of providing subsequent data.

In step S254, the sever 530 stores the package received from the package generating section 514, that is, the package formed by a file set with which the virtual file system (VFS) can be updated, into the database 531. A package ID is associated with each package, and by specifying a package ID, a file set corresponding to the package ID can be extracted.

The foregoing completes the description of the process from steps S251 to S254, and represents a sequence of the process from generation of subsequent data to provision of the subsequent data to the server.

Next, a description will be given of the process from steps S271 to S273, that is, a process of acquiring subsequent data by the user apparatus from the server.

The information processing apparatus 540 as the user apparatus sets the disc in the apparatus, and executes the program (BD-J program) recorded on the disc 550. This program is a program for executing an acquisition process of subsequent data and, as described above, includes a program for executing a subsequent data requesting process of transmitting to the server a specific package ID selected in accordance with subsequent-data specifying information selected by the user, for example.

Through execution of the program in the information processing apparatus 540, in step S272, for example, a specific package ID selected in accordance with subsequent-data specifying information selected by the user is transmitted to the server 530.

In accordance with the package ID received from the information processing apparatus 540, the server 530 acquires a file set corresponding to the package ID from the database 531, and in step S273, transmits the acquired file set to the information processing apparatus 540 of the user.

Thereafter, the information processing apparatus 540 of the user stores files of subsequent data included in the package received from the server 530, into the local storage section such as a hard disk. Further, when performing a content playback process, the playback process is executed by building a virtual file system (VFS) (see FIG. 5) as an integrated virtual file system formed by files stored on the disc 550 and files stored on the local storage section.

At the time of building this virtual file system (VFS), when using newly acquired subsequent data, an update of the virtual file system (VFS) is performed. However, in this VFS update, if there are missing files or the like, a complete VFS update process is not executed.

However, through the processing according to an embodiment of the present invention, it is guaranteed that the file set included in the package transmitted from the server 530 is a complete file set that allows a VFS update. Therefore, content can be played back on the information processing apparatus 540 of the user without occurrence of a situation where the information processing apparatus 540 fails in updating the virtual file system (VFS) and thus becomes unable to play back the content.

The above-described embodiment is directed to the case in which a program pre-recorded on the disc is used as the program (BD-J program) for causing the information processing apparatus as a user apparatus to execute a process of acquiring subsequent data from the user. However, a configuration is also possible in which a similar program (BD-J program) is received from the server, and the program received from the server is used to perform an acquisition process of subsequent data.

[4. Process Example Using Group IDs as Package Subdivision Information]

Next, a description will be given of a process example using group IDs as package subdivision information. The above-described process example is directed to the configuration in which a package including files that surely allows updating of a virtual file system (VFS) is set, and a package ID as an identifier of each package is used to provide a file set to the user apparatus.

However, depending on the package settings, there are times when it is not necessary to provide all the files included in a single package to the user apparatus. This is the case with the package settings shown in FIG. 11, for example. A package 610 shown in FIG. 11 includes a plurality of files. The following four categories of file set are included in the package 610.

A file set A 611 related to subsequent data A
A file set B 612 related to subsequent data B
A file set C 613 related to subsequent data C
An auxiliary file set 614 used commonly for subsequent data A, B, and C The whole files contained in the package 610 include files that allow updating of a virtual file system (VFS).

However, updating of a virtual file system (VFS) is possible even with only file sets including the file set A 611 related to subsequent data A, and the auxiliary file set 614 used commonly for subsequent data A, B, and C.

Likewise, updating of a virtual file system (VFS) is possible even with only the file set B 612 and the auxiliary file set 614.

Likewise, updating of a virtual file system (VFS) is possible even with only the file set C 612 and the auxiliary file set 614.

A package with the above-mentioned settings is also constructed in some cases.

For example, a specific example of such settings may be such that the package 610 is set as subtitle information package, subsequent data A is set as Japanese, subsequent data B is set as French, and subsequent data C is set as Chinese, and the auxiliary file set is auxiliary data that is applied commonly to the display of these subtitles.

In this case, even when it is necessary for the apparatus on the user side to acquire only subsequent data A and the auxiliary files, according to the above-described embodiment, the file set to be acquired is determined by the package ID, with the result that unnecessary pieces of subsequent data B and C are also received.

Further, as described above, provision of subsequent data to the user apparatus from the server is not limited to once, but there are cases where, after the release of a disc, new subsequent-data packages are provided to the user with the elapse of time in the manner of a first package of subsequent data, a second package of subsequent data, a third package of subsequent data, and so on.

In such cases, there are times when files in the file set included in the first package of subsequent data, and files in the file set included in the second package of subsequent data overlap. In such a case, the user apparatus receives the same data twice, resulting in unnecessary processing.

Figure 12:
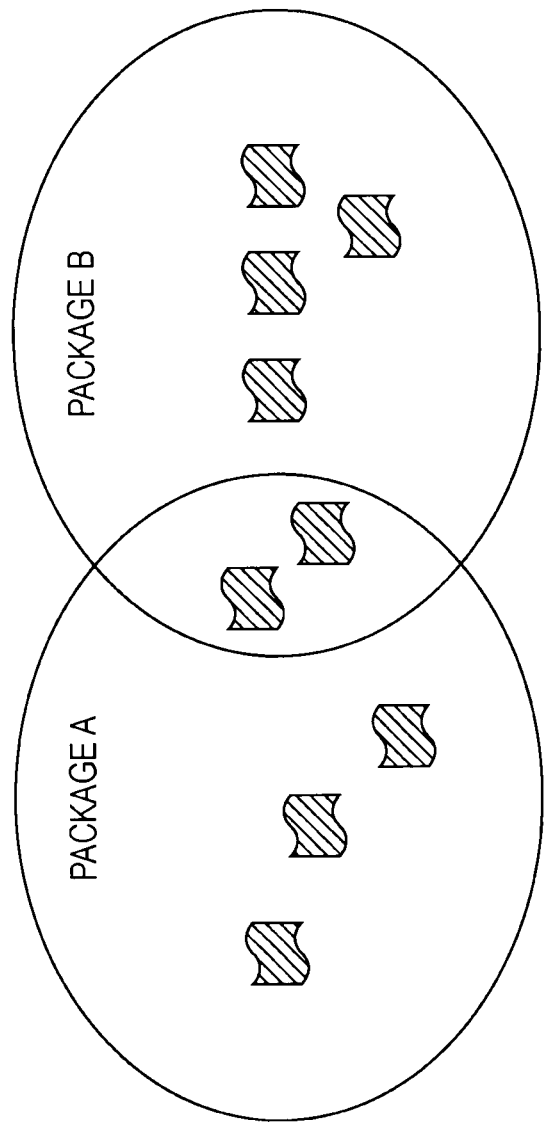
FIG. 12 is a diagram illustrating a problem associated with using only package IDs.

For example, a case is considered in which, as shown in FIG. 12, there are files that are included commonly in package A and package B. If the user apparatus has already received package A, if the whole files in package B are received, this results in reception of overlapping files.

Figure 13:
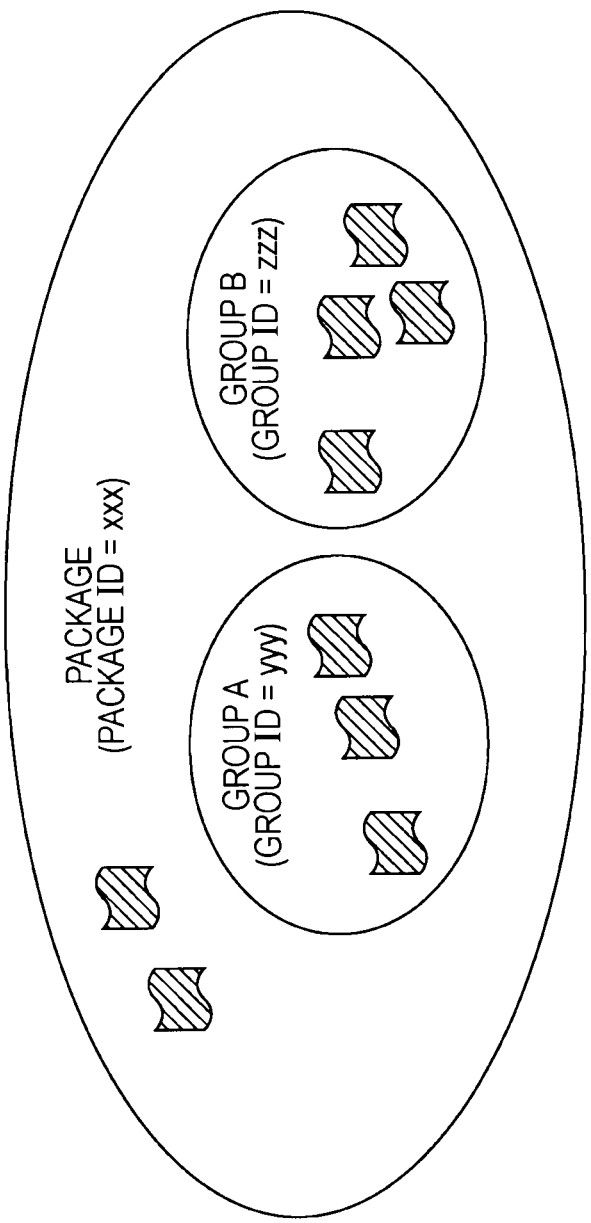
FIG. 13 is a diagram illustrating a process example in which not only package IDs but also group IDs are used.

To overcome this problem, group IDs as package subdivision information are used. For example, as shown in FIG. 13, groups of file sets each including only some of files included in a given package (package ID=xxx) are set, and a group ID is set in correspondence to each of the groups.

In the example shown in FIG. 13, files in a package (package ID=xxx) is subdivided in three as follows.

(a) Group A=Group ID=yyy (b) Group B=Group ID=zzz (c) Others

While it is possible for the user apparatus to execute a request for subsequent data to the server by specifying a package ID, a setting is also possible such that the user apparatus further specifies a group ID to request for only a file set included in a specific group of a specific package.

In this process example, in the overall process sequence described above with reference to FIG. 9, the subsequent data-attribute-information generating section 511 executes creation of not only package IDs but also group IDs. In addition, the content editing section 513 creates file sets on a per-group ID basis, and provides the file sets to the package generating section 514. The package generating section 514 executes setting of groups, in addition to setting of packages.

The above-mentioned settings enable a process such that, at the time of requesting the server for subsequent data, the user apparatus specifies a group ID to thereby request for only a file set included in a specific group of a specific package.

Figure 11:
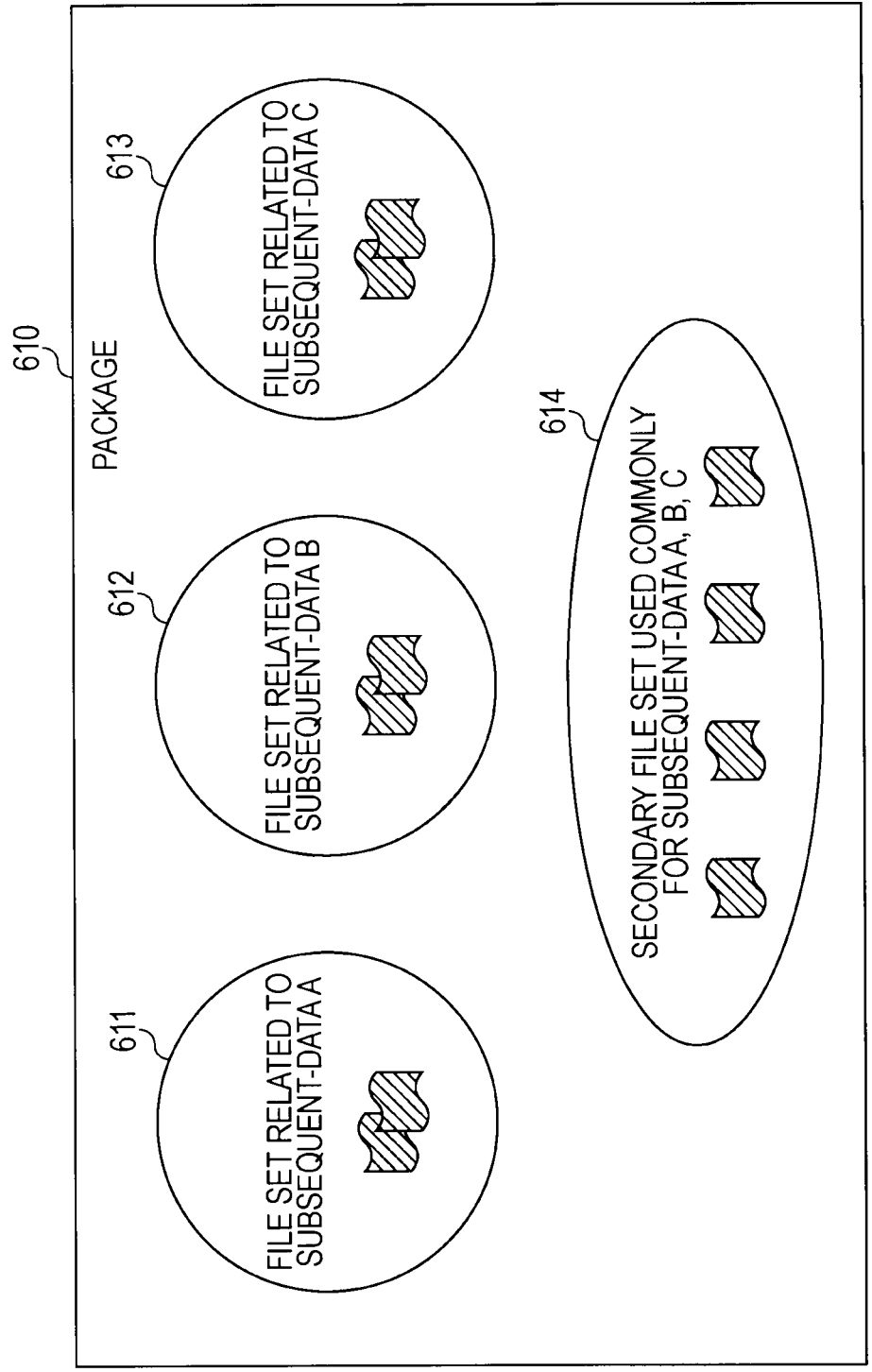
FIG. 11 is a diagram illustrating a problem associated with using only package IDs.
Figure 14:
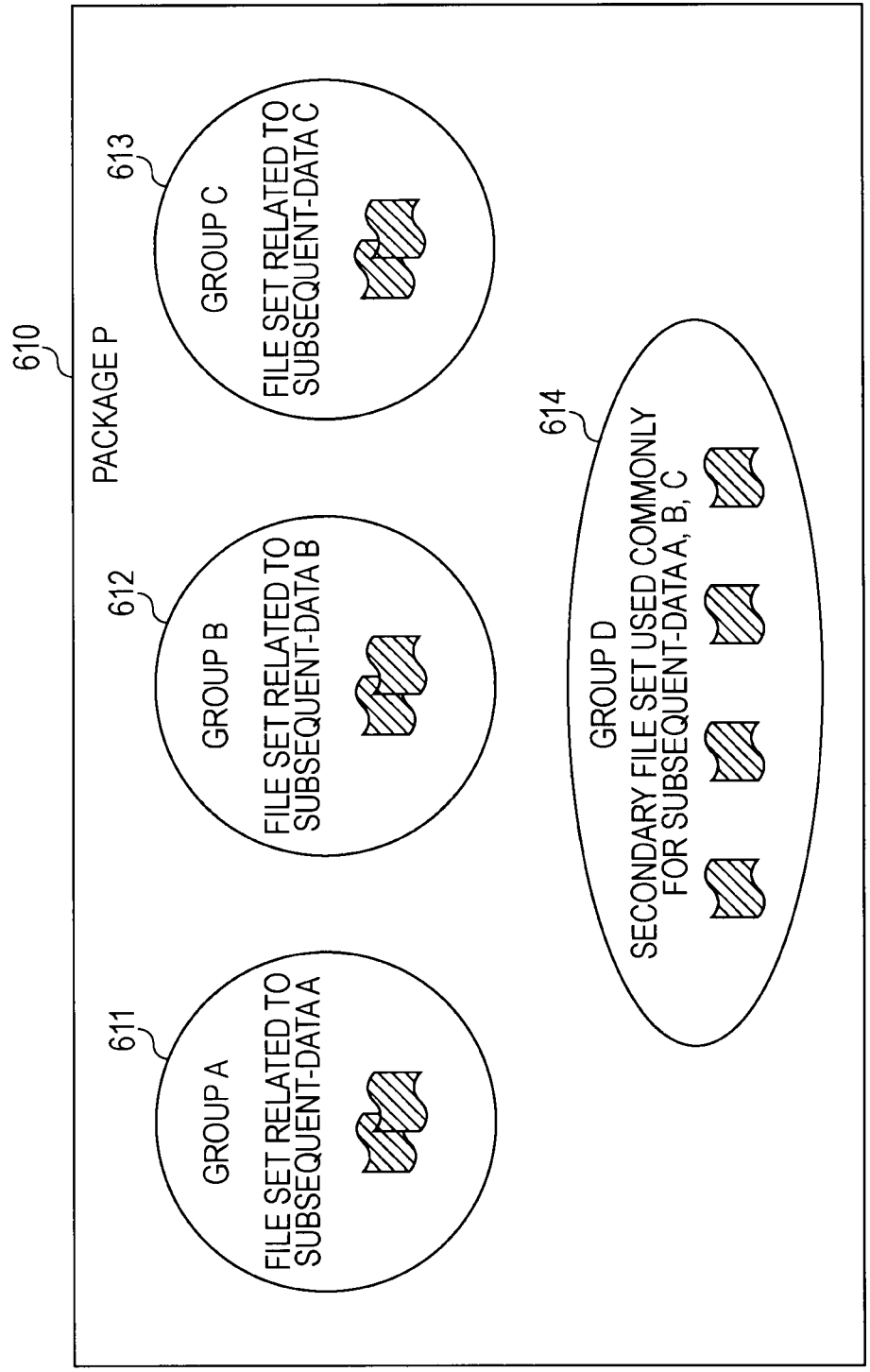
FIG. 14 is a diagram illustrating a process example in which not only package IDs but also group IDs are used.

For example, in the case of the settings shown in FIG. 11 described above, unnecessary file receptions can be prevented by using group IDs. That is, groups are set for file sets included in a single package P 610 shown in FIG. 14.

That is, the following groups are set.

Group A=a file set A611 related to subsequent data A

Group B=a file set A612 related to subsequent data B

Group C=a file set A613 related to subsequent data C

Group D=an auxiliary file set 614 used commonly for subsequent data A, B, and C These four groups A to D are set, and associated with different group IDs.

The user apparatus requests for subsequent data by transmitting a group ID of group A and a group ID of group D to the server, in addition to a package ID indicating package P, for example.

In this case, the server selects not all the files included in package P but only files of group A and files of group D, and transmits the selected files to the user apparatus.

The user apparatus receives only the files of group A and the files of group D, and stores the received files onto the local storage section. Updating of a virtual file system is executed without any problem only with these pieces of data. This configuration makes it possible for the user apparatus to avoid reception of unnecessary files that are not used.

Likewise, in the case of the settings as shown in FIG. 12 described above as well, that is, in the case where common files are included in a plurality of packages, it is possible to prevent transmission/reception of the same files by setting groups.

That is, as shown in FIG. 15, a file set including only those files which are included in package B but not included in package A is set as group A, and a group ID is set for group A.

This configuration allows a user apparatus that has already received the file set of package A to receive only the files included in group A, by making a request for subsequent data while transmitting a package ID of package B and a group ID of group A to the server. That is, it is possible to receive only necessary files, without overlapping reception of files that have already been received.

The present invention has been described above in detail with reference to specific embodiments. However, it is obvious that a person skilled in the art can make various modifications to and substitutions for the embodiments without departing from the scope of the present invention. That is, the present invention has been disclosed by way of examples, and should not be construed restrictively. The scope of the present invention should be determined with reference to the appended claims.

The series of processes described in this specification can be executed by hardware, software, or a composite configuration of both. If the series of processes is to be executed by software, the series of processes can be executed by installing a program recording the process sequence into a memory in a computer embedded in dedicated hardware, or by installing the program into a general purpose computer capable of executing various processes. For example, the program can be pre-recorded on a recording medium. Other than being installed into a computer from a recording medium, the program can be received via a network such as the LAN (Local Area Network) or the Internet, and installed into a built-in recording medium such as a hard disk.

The various processes described in this specification may be executed not only on the time series as they appear in the description but may be executed in parallel or independently depending on the throughput of the device executing the processes. In addition, the term system as used in this specification refers to a logical collection of a plurality of devices, and is not limited to one in which the constituent devices are located within the same housing.

The present application contains subject matter related to that disclosed in Japanese Priority Patent Application JP 2008-181916 filed in the Japan Patent Office on Jul. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   processing circuitry;
   a communicating section that executes communication with a server;
   a local storage section that stores subsequent data acquired from the server, wherein the subsequent data corresponds to substance data on a disc; and
   a data processing section, implemented by the processing circuitry, that executes an acquisition process of the subsequent data, and a data playback process using the substance data stored on the disc and the subsequent data stored on the local storage section,
   wherein the data processing section:
   builds a virtual file system for reading the substance data stored on the disc and the subsequent data stored in the local storage section, by using a file name conversion table to convert file names of the subsequent data into file names in the virtual file system, and combining the substance data from the disc and the subsequent data from the local storage section into the virtual file system, at the time of the data playback process,
   performs the acquisition process of the subsequent data by transmitting a package ID to the server at the time of the acquisition process of the subsequent data, the package ID being information specifying a package, wherein the package contains elements within a complete file set that are necessary for building or updating the virtual file system, the complete file set including some combination of substance data of the subsequent data, a key file corresponding to the substance data, a usage control information file corresponding to the substance data, a binding unit manifest file (BUMF) including the file name conversion table corresponding to the substance data, a signature file for verifying the authenticity of the BUMF,
   wherein the package ID, transmitted to the server at the time of the acquiring process of the subsequent data, is stored on the disc in correspondence with a reference to the subsequent data, wherein the package ID is stored on the disc without the storage of the subsequent data, which is acquired by the performance of the acquisition process of the subsequent data.

2. The information processing apparatus according to claim 1, wherein the data processing section executes a program recorded on the disc to execute the acquisition process of the subsequent data, and performs the acquisition process of the subsequent data by transmitting a package ID recorded on the program to the server.

3. The information processing apparatus according to claim 1, wherein the data processing section executes a server-provided program provided from the server to execute the acquisition process of the subsequent data, and performs the acquisition process of the subsequent data by transmitting a package ID recorded in the server-provided program to the server.

4. The information processing apparatus according to claim 1, wherein the data processing section performs the acquisition process of the subsequent data by transmitting a group ID to the server at the time of the acquisition process of the subsequent data, the group ID being information specifying a group corresponding to a file set necessary for building or updating the virtual file system and being information specifying a group corresponding to a file set including part of files forming the package.

5. A server comprising:
   processing circuitry;
   a communicating section that executes communication with a user apparatus;
   a database that stores subsequent data to be provided to the user apparatus, wherein the subsequent data corresponds to substance data on a disc; and
   a data processing section, implemented by the processing circuitry, that receives a subsequent-data acquisition request from the user apparatus via the communicating section, and transmits subsequent data acquired from the database to the user apparatus, wherein,
   the data processing section performs a process of receiving a package ID as a requested-data identifier contained in the subsequent-data acquisition request from the user apparatus, extracting a file set associated with the package ID from the database, and transmitting the file set to the user apparatus,
   the package ID is information specifying a package, wherein the package contains elements within a complete file set that are necessary for building or updating a virtual file system that is set in the user apparatus to read data stored on a disc and a local storage section, the complete file set including some combination of substance data of the subsequent data, a key file corresponding to the substance data, a usage control information file corresponding to the substance data, a binding unit manifest file (BUMF) including a file name conversion table corresponding to the substance data, a signature file for verifying the authenticity of the BUMF,
   wherein the virtual file system is built for reading the substance data stored on the disc and the transmitted subsequent data originally stored in the database, by using the file name conversion table to convert file names of the subsequent data into file names on the virtual file system, and combining the substance data from the disc and the transmitted subsequent data into the virtual file system,
   wherein the package ID, transmitted to the server, is stored on the disc in correspondence with a reference to the subsequent data, wherein the package ID is stored on the disc without the storage of the subsequent data, which is transmitted to the user apparatus, and
   the data processing section performs a process of applying the package ID as information for selecting data to be transmitted to the user apparatus.

6. The server according to claim 5, wherein the data processing section receives a group ID from the user apparatus, and performs a process of applying the group ID as information for selecting data to be transmitted to the user apparatus, the group ID being information specifying a group corresponding to a file set necessary for building or updating the virtual file system and being information specifying a group corresponding to a file set including part of files forming the package.

7. An information processing system comprising:
an information processing apparatus, including processing circuitry, in which a disc is mounted and which performs a playback process of substance data stored on the disc; and
a server, including processing circuitry, that receives a data acquisition request from the information processing apparatus, and performs a provision process of subsequent data to the information processing apparatus, wherein,
the subsequent data corresponds to the substance data on the disc,
the information processing apparatus performs a data playback process by building a virtual file system for reading the substance data stored on the disc and subsequent data stored on a local storage section, and performs an acquisition process of the subsequent data by transmitting a package ID to the server at the time of the acquisition process of the subsequent data, the package ID being information specifying a package, wherein the package contains elements within a complete file set that are necessary for building or updating the virtual file system, the complete file set including some combination of substance data of the subsequent data, a key file corresponding to the substance data, a usage control information file corresponding to the substance data, a binding unit manifest file (BUMF) including a file name conversion table corresponding to the substance data, a signature file for verifying the authenticity of the BUMF,
wherein the package ID, transmitted to the server at the time of the acquiring process of the subsequent data, is stored on the disc in correspondence with a reference to the subsequent data, wherein the package ID is stored on the disc without the storage of the subsequent data, which is acquired by the performance of the acquisition process of the subsequent data,
wherein the virtual file system is built for reading the substance data stored on the disc and the subsequent data stored in the local storage section, by using the file name conversion table to convert file names of the subsequent data into file names on the virtual file system, and combining the data from the disc and the local storage section into the virtual file system, and
the server receives the package ID contained in a subsequent-data acquisition request from the information processing apparatus, extracts a file set associated with the package ID from a database, and transmits the file set to the information processing apparatus.

8. A non-transitory computer readable information recording medium recording:
content to be played back by an information processing apparatus having processing circuitry; and
a program for causing the information processing apparatus to execute an acquisition process of subsequent data from a server, wherein
the program is a program recording a package ID, and recording a sequence for causing the information processing apparatus to transmit the package ID to the server to execute the acquisition process of subsequent data, at the time of a data playback process in the information processing apparatus, the package ID being information specifying a package,
wherein the subsequent data corresponds to substance data on a disc,
wherein the package contains elements within a complete file set that are necessary for building or updating a virtual file system for reading the substance data stored on the information recording medium and the subsequent data stored in a local storage section, by using a file name conversion table to convert file names of the subsequent data into file names in the virtual file system, and combining the data from the disc and the local storage section into the virtual file system,
wherein the complete file set includes some combination of substance data of the subsequent data, a key file corresponding to the substance data, a usage control information file corresponding to the substance data, a binding unit manifest file (BUMF) including the file name conversion table corresponding to the substance data, a signature file for verifying the authenticity of the BUMF, and
wherein the package ID, transmitted to the server at the time of the acquiring process of the subsequent data, is stored on the disc in correspondence with a reference to the subsequent data, wherein the package ID is stored on the disc without the storage of the subsequent data, which is acquired by the performance of the acquisition process of the subsequent data.

9. An information processing method which is executed in an information processing apparatus, comprising:
a subsequent-data acquiring step of a data processing section performing an acquisition process of subsequent data from a server, wherein the subsequent data corresponds to substance data on a disc; and
a data playback step of the data processing section executing a data playback process using the substance data stored on the disc, and subsequent data stored on a local storage section, wherein,
the data playback step includes executing the data playback process by building a virtual file system for reading the substance data stored on the disc and the subsequent data stored in the local storage section, by using a file name conversion table to convert file names of the subsequent data into file names in the virtual file system, and combining the data from the disc and the local storage section into the virtual file system, and
the subsequent-data acquiring step includes performing the acquisition process of subsequent data by transmitting a package ID to the server, the package ID being information specifying a package, wherein the package contains elements within a complete file set that are necessary for building or updating the virtual file system, the complete file set including some combination of substance data of the subsequent data, a key file corresponding to the substance data, a usage control information file corresponding to the substance data, a binding unit manifest file (BUMF) including the file name conversion table corresponding to the substance data, a signature file for verifying the authenticity of the BUMF,
wherein the package ID, transmitted to the server at the time of the acquiring process of the subsequent data, is stored on the disc in correspondence with a reference to the subsequent data, wherein the package ID is stored on the disc without the storage of the subsequent data, which is acquired by the performance of the acquisition process of the subsequent data.

10. An information processing method for a server that executes a provision process of subsequent data to a user apparatus, comprising:
a subsequent-data providing step of a data processing section receiving a package ID as a requested-data identifier contained in a subsequent-data acquisition request from the user apparatus, extracting a file set associated with the package ID from a database that stores subsequent data to be provided to the user apparatus, wherein the subsequent data corresponds to substance data on a disc, and transmitting the file set to the user apparatus, wherein, the package ID is information specifying a package, wherein the package contains elements within a complete file set that are necessary for building or updating a virtual file system that is set in the user apparatus to read data stored on a disc and a local storage section, the complete file set including some combination of substance data of the subsequent data, a key file corresponding to the substance data, a usage control information file corresponding to the substance data, a binding unit manifest file (BUMF) including a file name conversion table corresponding to the substance data, a signature file for verifying the authenticity of the BUMF, wherein the virtual file system is built for reading the substance data stored on the disc and the transmitted subsequent data originally stored in the database, by using the file name conversion table to convert file names of the subsequent data into file names on the virtual file system, and combining the data from the disc and the transmitted subsequent data into the virtual file system, wherein the package ID, transmitted to the server, is stored on the disc in correspondence with a reference to the subsequent data, wherein the package ID is stored on the disc without the storage of the subsequent data, which is transmitted to the user apparatus, and the subsequent-data providing step includes performing a process of applying the package ID as information for selecting data to be transmitted to the user apparatus.

11. A non-transitory computer readable storage medium on which a program is recorded for causing an information processing apparatus to execute information processing, the information processing comprising:

a subsequent-data acquiring step of a data processing section performing an acquisition process of subsequent data from a server, wherein the subsequent data corresponds to substance data on a disc; and a data playback step of the data processing section executing a data playback process using the substance data stored on the disc, and subsequent data stored on a local storage section, wherein, the data playback step includes executing the data playback process by building a virtual file system for reading the substance data stored on the disc and the subsequent data stored in the local storage section, by using a file name conversion table to convert file names of the subsequent data into file names in the virtual file system, and combining the data from the disc and the local storage section into the virtual file system, and the subsequent-data acquiring step includes performing the acquisition process of subsequent data by transmitting a package ID to the server, the package ID being information specifying a package, wherein the package contains elements within a complete file set that are necessary for building or updating the virtual file system, the complete file set including some combination of substance data of the subsequent data, a key file corresponding to the substance data, a usage control information file corresponding to the substance data, a binding unit manifest file (BUMF) including the file name conversion table corresponding to the substance data, a signature file for verifying the authenticity of the BUMF, wherein the package ID, transmitted to the server at the time of the acquiring process of the subsequent data, is stored on the disc in correspondence with a reference to the subsequent data, wherein the package ID is stored on the disc without the storage of the subsequent data, which is acquired by the performance of the acquisition process of the subsequent data.

12. A non-transitory computer readable storage medium on which a program is recorded for causing a server to execute a provision process of subsequent data to a user apparatus, the provision process comprising:

a subsequent-data providing step of a data processing section receiving a package ID as a requested-data identifier contained in a subsequent-data acquisition request from the user apparatus, extracting a file set associated with the package ID from a database that stores subsequent data to be provided to the user apparatus, wherein the subsequent data corresponds to substance data on a disc, and transmitting the file set to the user apparatus, wherein, the package ID is information specifying a package, wherein the package contains elements within a complete file set that are necessary for building or updating a virtual file system that is set in the user apparatus to read data stored on a disc and a local storage section, the complete file set including some combination of substance data of the subsequent data, a key file corresponding to the substance data, a usage control information file corresponding to the substance data, a binding unit manifest file (BUMF) including a file name conversion table corresponding to the substance data, a signature file for verifying the authenticity of the BUMF, wherein the virtual file system is built for reading the substance data stored on the disc and the transmitted subsequent data originally stored in the database, by using the file name conversion table to convert file names of the subsequent data into file names on the virtual file system, and combining the data from the disc and the transmitted subsequent data into the virtual file system, wherein the package ID, transmitted to the server, is stored on the disc in correspondence with a reference to the subsequent data, wherein the package ID is stored on the disc without the storage of the subsequent data, which is transmitted to the user apparatus, and the subsequent-data providing step includes performing a process of applying the package ID as information for selecting data to be transmitted to the user apparatus.

* * * * *